US010034508B2

(12) United States Patent
Frank et al.

(10) Patent No.: US 10,034,508 B2
(45) Date of Patent: Jul. 31, 2018

(54) WEIGHT-DISTRIBUTING HEADBAND FOR HEAD-WORN ASSEMBLY

(71) Applicant: MICROSOFT TECHNOLOGY LICENSING, LLC, Redmond, WA (US)

(72) Inventors: Philip Andrew Frank, Kirkland, WA (US); Aditha May Adams, Seattle, WA (US); Henric Jentz, Seattle, WA (US); Errol Mark Tazbaz, Bellevue, WA (US); Nicolas Denhez, Seattle, WA (US); Paul Bosveld, Seattle, WA (US); Travis Justin Hosler, Seattle, WA (US); YeongKyu Yoo, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 92 days.

(21) Appl. No.: 14/458,066

(22) Filed: Aug. 12, 2014

(65) Prior Publication Data
US 2016/0044981 A1    Feb. 18, 2016

(51) Int. Cl.
    *A42B 1/22*    (2006.01)
    *A42B 1/24*    (2006.01)
    *G02B 27/01*   (2006.01)

(52) U.S. Cl.
    CPC ............ *A42B 1/22* (2013.01); *G02B 27/0176* (2013.01)

(58) Field of Classification Search
    CPC .. A42B 1/24; A42B 3/08; A42B 3/085; A42B 3/145; A42B 3/30; A42B 3/306;
    (Continued)

(56) References Cited

U.S. PATENT DOCUMENTS

| 2,418,334 A | * | 4/1947 | Coccellato | A61F 9/025 |
| | | | | 2/8.2 |
| 2,445,355 A | * | 7/1948 | Hurt | A42B 1/247 |
| | | | | 2/10 |

(Continued)

FOREIGN PATENT DOCUMENTS

| AT | 7281 U1 | 12/2004 |
| CN | 203314184 U | 12/2013 |

OTHER PUBLICATIONS

Translation of CN203314184, Fan, Xiaogang et al, Head-wearing Type Equipment, Dec. 4, 2013, translated via Google on Apr. 14, 2016.*

(Continued)

*Primary Examiner* — Jameson Collier
*Assistant Examiner* — Heather Mangine
(74) *Attorney, Agent, or Firm* — Rainier Patents, P.S.

(57) ABSTRACT

A head-worn assembly is disclosed including a head-worn device supported on a headband. The headband may include a first loop positioned around the head, and possibly a second loop affixed to the first loop and positioned over the head. Weight distribution and comfort of the head-worn assembly may be optimized by mounting the head-worn device at an approximate center (front to back) of the headband, and further balancing the weight of the head-worn device (front to back) over the mounting point. The weight distribution and comfort of the head-worn assembly may be further optimized by providing several user-customizable adjustments to the head-worn assembly.

20 Claims, 13 Drawing Sheets

(58) Field of Classification Search
CPC ........... A42B 1/22; A42B 1/242; A42B 1/245; A42B 3/14; A42B 3/142; A42B 1/244; G02B 27/0176; G02B 27/017; G02B 27/01; G02B 27/0172; G02B 27/0174; A42C 5/00; A61F 9/06
USPC ... 2/422, 410, 416, 417, 418, 419, 420, 421, 2/181, 8.2, 423, 424; 345/8
See application file for complete search history.

(56) References Cited

U.S. PATENT DOCUMENTS

| | | | | |
|---|---|---|---|---|
| 4,198,114 | A * | 4/1980 | Zapp | G02B 27/0172 359/376 |
| 5,321,416 | A * | 6/1994 | Bassett | A42B 3/145 345/8 |
| 5,486,841 | A * | 1/1996 | Hara | G02B 7/12 345/8 |
| 5,548,841 | A * | 8/1996 | Sherlock | A61F 9/027 2/11 |
| 5,628,071 | A * | 5/1997 | Nezer | A42B 3/322 2/410 |
| 5,715,023 | A * | 2/1998 | Hoppe | G02B 5/3016 349/11 |
| 5,767,820 | A | 6/1998 | Bassett et al. | |
| 5,774,096 | A * | 6/1998 | Usuki | G02B 7/12 340/980 |
| 5,842,931 | A * | 12/1998 | Payne | A63B 24/0003 273/DIG. 30 |
| 5,844,530 | A * | 12/1998 | Tosaki | G02B 27/017 345/7 |
| 5,844,656 | A | 12/1998 | Ronzani et al. | |
| 5,943,165 | A * | 8/1999 | Huang | G02B 7/002 348/E13.039 |
| 6,084,555 | A * | 7/2000 | Mizoguchi | G02B 7/12 345/8 |
| 6,160,666 | A | 12/2000 | Rallison et al. | |
| 6,215,460 | B1 * | 4/2001 | Mizoguchi | G02B 27/0172 345/7 |
| 6,341,382 | B1 | 1/2002 | Ryvin et al. | |
| 6,367,085 | B1 * | 4/2002 | Berg | A42B 3/145 128/201.24 |
| 6,515,853 | B2 * | 2/2003 | Saito | G06F 1/163 349/58 |
| 6,768,584 | B2 * | 7/2004 | Newkirk | G02B 7/003 345/8 |
| 7,441,282 | B2 * | 10/2008 | Heine | A61B 90/50 2/418 |
| 7,865,968 | B2 | 1/2011 | Lilenthal et al. | |
| 7,962,972 | B2 * | 6/2011 | Nakabayashi | G02B 27/0176 2/421 |
| 9,690,119 | B2 * | 6/2017 | Garofolo | G02C 7/14 |
| 9,810,911 | B2 * | 11/2017 | Miller | F16M 13/00 |
| 9,897,812 | B2 * | 2/2018 | Miller | G02B 27/0176 |
| 2002/0008677 | A1 * | 1/2002 | Saito | G02B 27/0176 345/8 |
| 2007/0018908 | A1 * | 1/2007 | Nakabayashi | G02B 27/0176 345/8 |
| 2007/0245466 | A1 * | 10/2007 | Lilenthal | A42B 3/14 2/416 |
| 2008/0022441 | A1 | 1/2008 | Oranchak et al. | |
| 2008/0120763 | A1 * | 5/2008 | Clark | A42B 1/247 2/209.13 |
| 2011/0047679 | A1 * | 3/2011 | Rogers | A42B 3/324 2/414 |
| 2011/0112448 | A1 * | 5/2011 | Wu | A42B 3/145 601/85 |
| 2011/0265254 | A1 * | 11/2011 | Ma | A42B 3/145 2/420 |
| 2012/0210489 | A1 | 8/2012 | Abreu | |
| 2014/0092587 | A1 | 4/2014 | Delaney et al. | |
| 2014/0364208 | A1 * | 12/2014 | Perry | A63F 13/00 463/31 |
| 2015/0316773 | A1 * | 11/2015 | Tazbaz | G02B 27/0179 359/630 |
| 2016/0044981 | A1 * | 2/2016 | Frank | G02B 27/0176 2/422 |
| 2016/0054570 | A1 * | 2/2016 | Bosveld | A41D 20/00 2/209.3 |
| 2016/0054571 | A1 * | 2/2016 | Tazbaz | G02B 27/0176 359/630 |
| 2016/0163221 | A1 * | 6/2016 | Sommers | A61F 9/06 434/234 |
| 2016/0216512 | A1 * | 7/2016 | Miller | G02B 27/0176 |
| 2016/0349839 | A1 * | 12/2016 | Ohba | G06F 3/012 |
| 2017/0150770 | A1 * | 6/2017 | Huh | A42B 3/324 |
| 2018/0042330 | A1 * | 2/2018 | Wu | A42B 3/085 |

OTHER PUBLICATIONS

Translation of CN 203314184 U, Fan, Head Gear, Apr. 12, 2013, Translated by Phoenix Tranlations, May 2017.*
"International Search Report and Written Opinion Issued in PCT Application No. PCT/US2015/044403", dated Feb. 19, 2016, 15 Pages. (MS# 339000.02).
"ProView XL Owner's Manual", Retrieved on: Apr. 25, 2013, Available at: http://site.ultimate3dheaven.com/PDF/ProviewXL50Manual.pdf.
"Sony Personal 3D Viewer", Retrieved on: Apr. 25, 2013, Available at: http://www.sony.com.au/microsite/hmd/index.html#overview/comfort.
Melzer, et al., "Guidelines for HMD Design", Retrieved on: Apr. 25, 2013, Available at: http://www.usaarl.army.mil/publications/HMD_Book09/files/Section%2026%20-%20Chapter17%20Guidelines%20for%20HMD%20design.pdf.
"Second Written Opinion Issued in PCT Application No. PCT/US2015/044403", dated Jun. 21, 2016, 5 Pages (MS# 339000.02).
Response to Communication filed Apr. 18, 2017 in European Patent Application No. 15753282.1, 19 Pages.

* cited by examiner

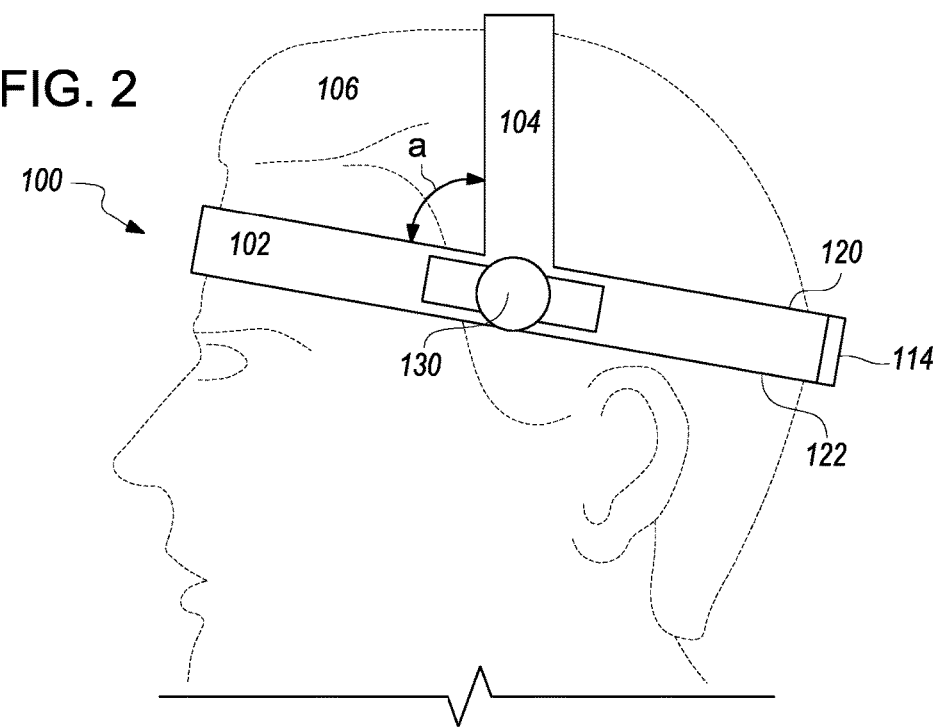
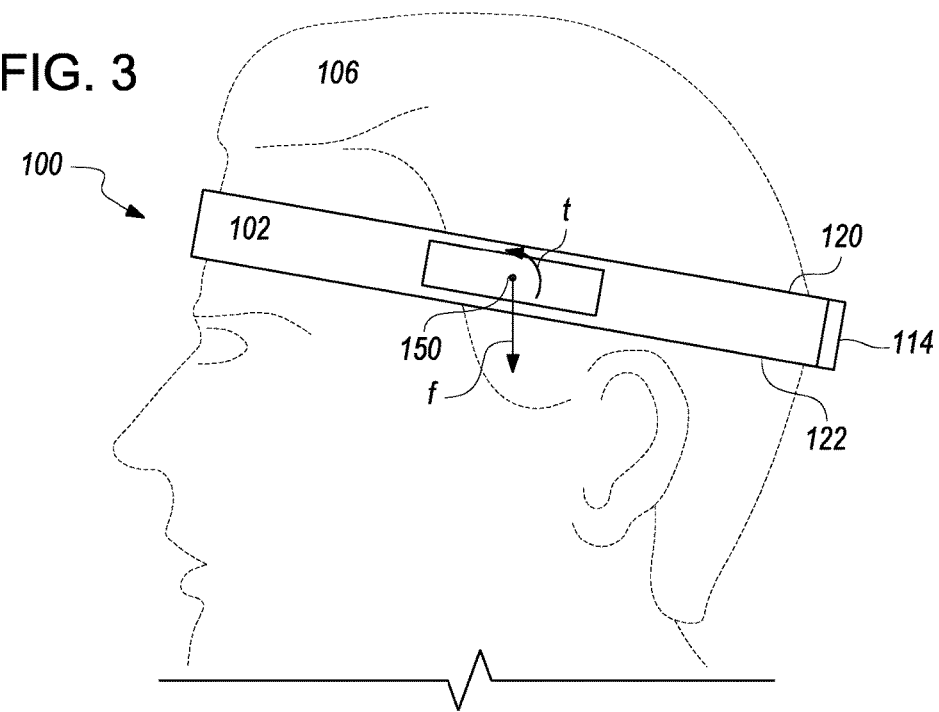

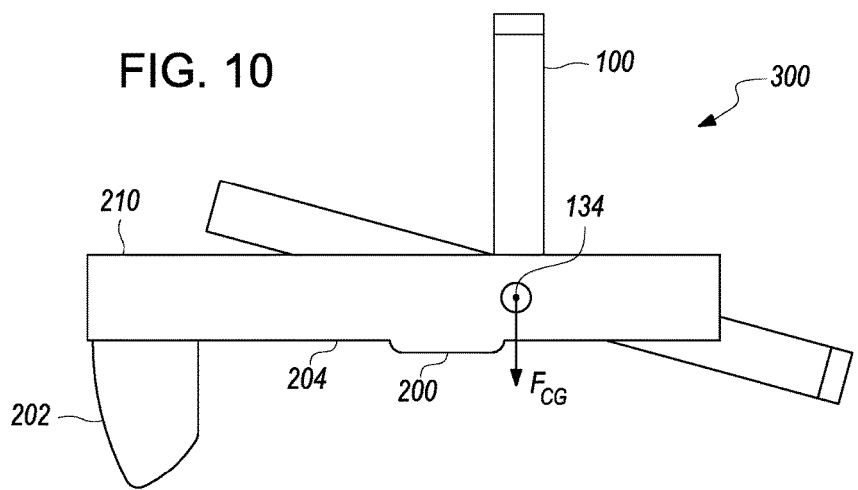
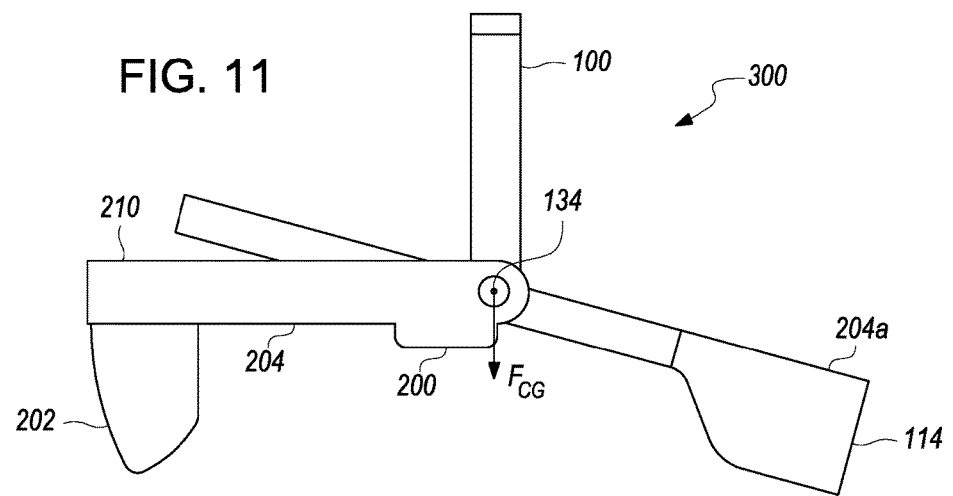

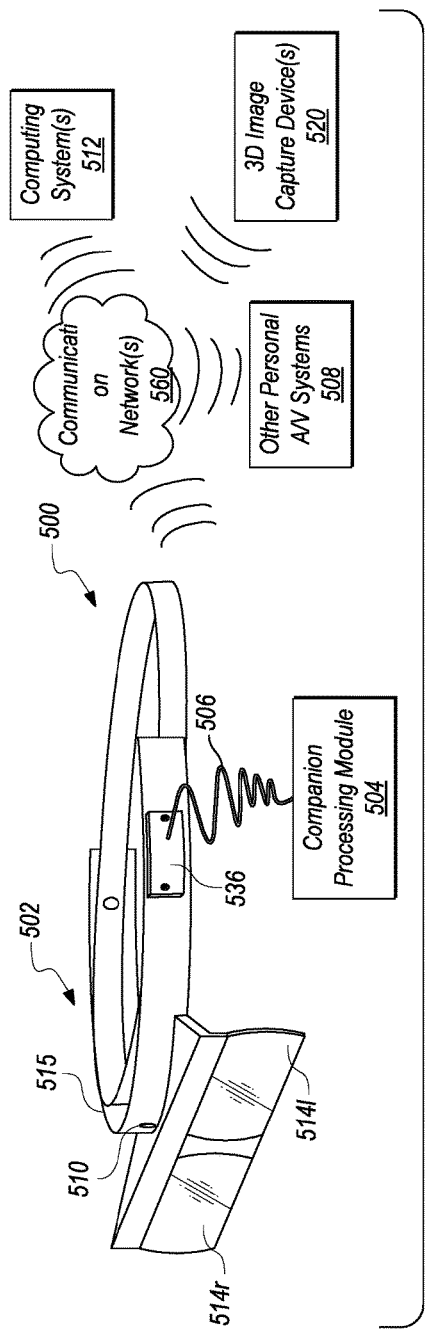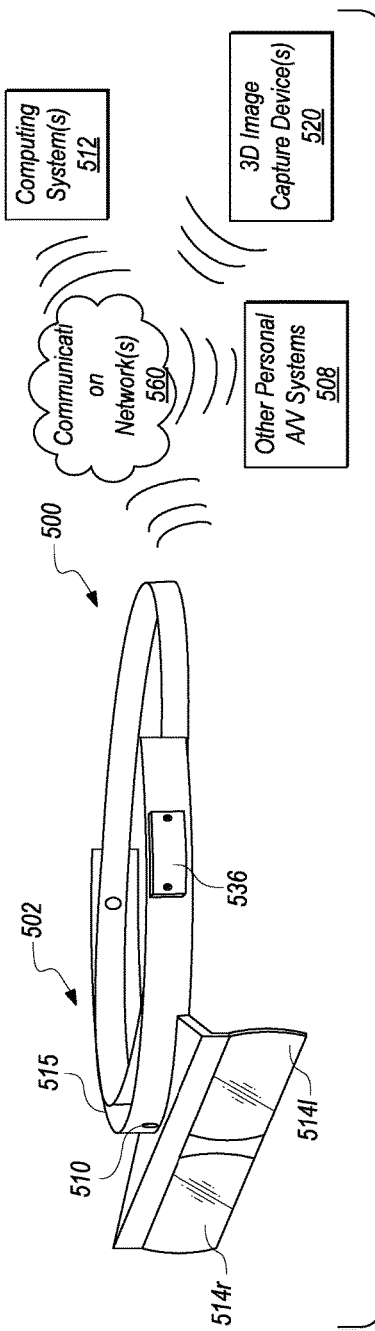

WEIGHT-DISTRIBUTING HEADBAND FOR HEAD-WORN ASSEMBLY

BACKGROUND

A head-worn device, such as a head mounted display (HMD), may be worn by a user for an augmented or virtual reality experience. Current headbands for supporting HMDs and other head-worn devices suffer the drawback that they do not evenly distribute or support the weight of the head-worn device and headband around a user's head. Consequently, pressure points develop at areas of the head bearing a greater proportion of the load, and these devices become uncomfortable to wear over prolonged periods of time. One reason for this drawback is that users have different head sizes and shapes, and existing designs do not adequately account for these size and shape variations.

SUMMARY

The present technology relates to various embodiments of a head-worn assembly including a head-worn device supported on a headband. The headband may include a first loop positioned around the head, and possibly a second loop affixed to the first loop and positioned over the head. The first and second loops may be adjustable to different sizes and with respect to each other. The head-worn device may for example be an HMD for presenting an augmented or virtual reality experience to the user.

In embodiments, weight distribution and comfort of the head-worn assembly may be optimized by mounting the head-worn device at an approximate center (front to back) of the headband, and further balancing the weight of the head-worn device (front to back) over the mounting point. The weight distribution and comfort of the head-worn assembly may be further optimized by providing several user-customizable adjustments to the head-worn assembly. The weight distribution and adjustability prevents resting of the head-worn device primarily on the nose, ears or the top of the head, and allows the head-worn device to be worn in a way that is comfortable and non-intrusive.

In a first example, the present technology relates to a head-worn assembly, comprising: a headband comprising a front portion adapted to be positioned at a front of a head, a rear portion adapted to be positioned at a rear of a head, the headband further including a first mounting position on a first side of the headband centrally between the front and rear portions, and a second mounting position on a second side of the headband, opposite the first side, centrally between the front and rear portions; and a head-worn device affixed to the headband at the first and second mounting positions, components of the head-worn device distributed on at least one of the head-worn device and headband to position a center of gravity of the head-worn device generally over an axis through the first and second mounting positions.

In a second example, the present technology relates to a head-worn assembly, comprising: a headband comprising: a crown loop with a front portion adapted to be positioned at a front of a head, a rear portion adapted to be positioned at a rear of a head, the crown loop further comprising a first mounting position on a first side of the crown loop centrally between the front and rear portions, and a second mounting position on a second side of the crown loop, opposite the first side, centrally between the front and rear portions, the crown loop further comprising crown loop adjustment mechanism to adjust a size of the crown loop, an overhead loop affixed to the crown loop, the overhead loop comprising an overhead loop adjustment mechanism to adjust a size of the overhead loop, wherein the crown loop adjustment mechanism and overhead loop adjustment mechanism enable the headband to be custom fit for different head sizes and user preferences; and a head-worn device affixed to the headband at the first and second mounting positions.

In a further example, the present technology relates to a head-worn assembly, comprising: a headband comprising: a crown loop with a front portion adapted to be positioned at a front of a head and a rear portion adapted to be positioned at a rear of a head, the crown loop further comprising crown loop adjustment mechanism to adjust a size of the crown loop, an overhead loop affixed to the crown loop, the overhead loop comprising an overhead loop adjustment mechanism to adjust a size of the overhead loop, wherein the crown loop adjustment mechanism and overhead loop adjustment mechanism enable the headband to be custom fit for different head sizes and user preferences; and a head-worn device affixed to the headband at first and second mounting positions on first and second opposed sides of the crown loop between the front and rear portions of the crown loop, components of the head-worn device being distributed on at least one of the head-worn device and headband to position a center of gravity of the head-worn device generally over an axis through the first and second mounting positions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2 is a side view of an embodiment of a headband including a crown loop and overhead loop worn by a user.

FIG. 3 is a side view of an embodiment of a headband including a crown loop worn by a user.

FIGS. 10-15 are side views of a head-worn assembly including a head-worn device affixed to a headband according to alternative embodiments of the present technology.

FIG. 19A is a block diagram depicting example components of an embodiment of a head-worn assembly having a near-eye augmented/virtual reality display and companion processing module.

FIG. 19B is a block diagram depicting example components of another embodiment of head-worn assembly having a near-eye augmented/virtual reality display.

DETAILED DESCRIPTION

Embodiments of the present technology will now be explained with reference to the figures, which in general relate to a variety of different headband configurations for supporting a head-worn device with a comfortable and non-intrusive fit. Some embodiments of the headband include an around-the-head loop, referred to herein as a crown loop. Other embodiments include a crown loop in combination with one or more overhead loops.

Each of these embodiments provides load distribution, long axis (front to back) compression, and compression against sides of the user's head. Such a distribution of forces provides comfort, in part by preventing pressure points, especially in those areas more sensitive to pain such as for example the nose, ears or the top of the head. Additionally, the head-worn device may be affixed to the headband at an approximate center of gravity (front to back) of the head-worn device. This further promotes comfort by preventing torque from the head-worn device on the headband, which would otherwise be transmitted from the headband to the head of a user.

The headband may be customized for different users and different head sizes, shapes and comfort preferences. Embodiments may provide an adjustable fit of the crown loop and/or overhead loop. Embodiments also allow adjustable positioning of the crown loop, overhead loop and/or head-worn device affixed to the headband.

The terms "top" and "bottom," "upper" and "lower," "vertical" and "horizontal" and "front" and "back" as may be used herein are by way of example and illustrative purposes only, and are not meant to limit the description of the invention inasmuch as the referenced item can be exchanged in position and orientation. Also, as used herein, the terms "approximately," "substantially" and/or "about" mean that the specified dimension or parameter may be varied within an acceptable manufacturing tolerance for a given application. In one embodiment, the acceptable manufacturing tolerance is ±0.25%.

In embodiments described below, the headband may be used for supporting an HMD providing a virtual and/or augmented reality experience. However, in alternate embodiments, the headband may be used to mount other head-worn devices, such as surgical loupes, high-power headlamps and other types of head mounted devices.

In addition to comfort, the headband in embodiments of the present technology maintains a precision fit around a user's head. For example, it is desirable with augmented and virtual reality HMDs that the optics be maintained in a precise alignment to a user's eyes, as even a slight misalignment can impair the stereoscopic effect. By preventing pressure points, the headband may be held securely in place with a relatively large compressive force that is evenly distributed around a user's head.

Figure 1:
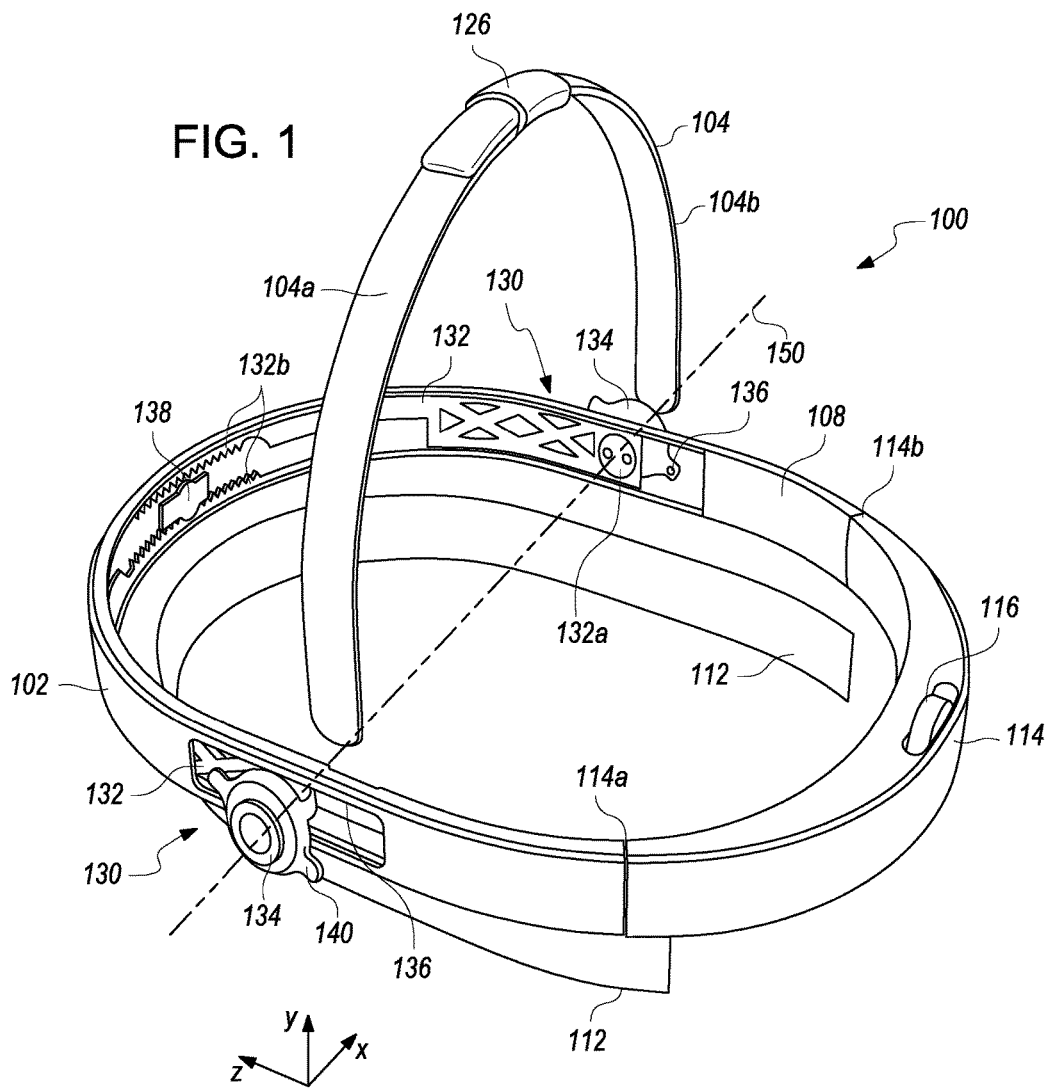
FIG. 1 is an exploded perspective view of a headband according to an embodiment of the present technology.

FIG. 1 is a perspective view of a first embodiment of a headband 100 having a crown loop 102 coupled to an overhead loop 104. FIGS. 2 and 3 are side views of the headband 100 worn on a user's head 106 (with the overhead loop 104 omitted in FIG. 4). As seen in FIG. 1, headband 100 may be comprised of semi-rigid members 108, with an inner cushioning material 112 formed of soft material. The members 108 may be or include an elastic, semi-rigid material such as a plastic, or metal including for example aluminum or a shape memory alloy such as alloys of copper-aluminium-nickel.

The cushioning material 112 may extend partially or completely around an interior (head-facing) portion of the crown loop 102 to provide a comfortable and slip resistant contact with the user's head 106. The cushioning material 112 may for example be or include polyurethane, a polyurethane foam, rubber or a plastic or other polymer. The cushioning material 112 may alternatively be or include fibers or fabric. Other materials are contemplated. In further embodiments, it is contemplated that, instead of two separate materials (the semi-rigid member(s) 108 and cushioning material 112), the headband 100 be comprised of a single material which is semi-rigid while at the same time being comfortable against a user's head.

The crown loop 102 may include a rear headpiece 114 positioned at the back of the head 106 when the headband 100 is worn. The rear headpiece 114 may be formed of a soft, cushioning material as described above with an internal cavity curved around the interior of the rear headpiece 114. The crown loop 102 may have first and second end sections (not shown) fitting within the internal cavity, through first and second ends 114a, 114b of the rear headpiece 114. The first and second end sections of the crown loop may engage within an adjustment mechanism within the rear headpiece 114 for adjusting the circumference of the crown loop 102 to be larger or smaller. This enables a user to comfortably and securely wear the headband 100 higher or lower around his or her head. It also allows a comfortable and secure fit of headband 100 for different users having different head sizes. In one example, the adjustment mechanism may comprise a frictional clutch. The frictional clutch in the rear headpiece 114 is not shown, but it may be similar in design and operation to frictional clutch 138 shown in FIG. 1 and described below.

In the example shown in FIG. 1, the crown loop 102 may be at its smallest circumference. From the position shown, manual rotation of a wheel 116 of the torsional clutch may extend lengths of the end sections of the crown loop 102 further out of the rear headpiece 114 to increase the circumference of the crown loop 102. Rotation of wheel 116 in the opposite direction again feeds the end sections back into the rear headpiece 114 to shrink the circumference of the crown loop 102. In embodiments, the crown loop 102 may be adjustable between 1 cm and 5 cm, though the amount by which the crown loop is adjustable may be less or more than that in further embodiments.

The adjustment mechanism may operate with known mechanisms other than a frictional clutch in further embodiments. In one such further example, the end sections may simply overlap each other within the rear headpiece 114, which holds the end sections together by static friction. A user may simply pull the end sections out of the rear headpiece 114, or feed them into the rear headpiece, to make the crown loop 102 larger or smaller.

In the embodiment of FIGS. 1-3, the headband 100 may be generally planar. That is, the headband 100 may have upper and lower edges, 120, 122 (FIGS. 2 and 3), each residing in planes that are parallel to each other. In embodiments, the rear headpiece 114 may be slightly wider than the rest of the headband 100 and may extend out of the above-mentioned parallel planes, though it may not in further embodiments. As explained below, the headband 100 may not be generally planar in further embodiments.

In examples, the headband may have a width between upper and lower edges 120, 122 of between 18 mm to 25 mm, though the width may vary outside of that range in further embodiments. The headband 100 (without the head-worn device) may have a mass of approximately 200 grams, though it may be greater or lesser than that in further embodiments. The thickness of the headband may also vary in embodiments, but in examples, may be 2 mm to 5 mm.

In the embodiments of FIGS. 1-3, the overhead loop 104 may be fixedly attached to the crown loop 102 so that an angle α (FIG. 2) between the crown and overhead loops may be fixed. In one example, the angle α may be 85°. In this way, the overhead loop 104 may be worn vertically (i.e., in a vertical plane) on the user's head while the crown loop is inclined at a slight angle of 5° with respect to horizontal. It is understood that this orientation of the headband 100 may vary, and the angle α may be greater than or less than 85°, in further embodiments. As explained below, the angle α may be made variable in further embodiments. Where the angle α is fixed, the overhead loop 104 may be formed integrally with the crown loop 102.

The overhead loop 104 may be formed of the same or similar semi-rigid material as member 108 of the crown loop 102. In embodiments, the overhead loop 104 may be lined with a soft cushioning material such as material 112, though the cushioning material may be omitted in further embodiments. The overhead loop 104 may be comprised of a pair of straps 104a, 104b (FIG. 1) that are joined together by an adjustment mechanism 126. In concert with adjustment of the crown loop, the adjustment mechanism 126 allows a user to adjust the height (vertical position) at which the headband 100 is worn around the head 106.

The adjustment mechanism 126 also allows the headband 100 to be adjusted for a comfortable and secure fit for users having different head sizes. The adjustment mechanism 126 may hold the straps 104a, 104b together by a frictional and/or snap fit which allows manual adjustment of the overhead loop 104 to different sizes. Other types of adjustment mechanisms 126, such as for example a frictional clutch, may be used in further embodiments. In one example, the overhead loop 104 may be adjusted between 1 cm and 5 cm, though this amount may be smaller or larger in further embodiments.

In embodiments, the headband 100 may include mounting positions in the form of a pair of kinematic assemblies 130 for translationally and pivotally mounting a head-worn device (explained below) to the headband 100. As best seen in FIG. 1, each kinematic assembly 130 may include a slide 132 mounted for translation within a track formed in a front portion of the crown loop 102. Each slide 132 includes a first end 132a supporting a pivot assembly 134 in a slot 136 for linear translation along the slot 136. A second end 132b of each slide 132 may engage a frictional clutch 138. In particular, each of the second ends 132b of the two slides 132 may have teeth for engaging the top and bottom edges, respectively, of a gear within the frictional clutch 138. Thus, the pair of slides 132 are constrained to translate with each other in unison forward and back within the slots 136 upon rotation of the frictional clutch 138.

Each pivot assembly 134 may include a base that is stationarily mounted to the slide 132, and a hub that is pivotally mounted to the base. Each hub may include a pair of mounting brackets 140 (one of which is numbered in one of the kinematic assemblies 130 shown in FIG. 1). The head-worn device described below may include a front section positioned in front of a user's head, and a pair of arms extending rearwardly from the front section. Ends of the rearwardly extending arms may be affixed to the mounting brackets 140 in each of the pivot assemblies 134 to affix the head-worn device to the pivot assemblies 134 and headband 100.

The pivot assemblies 134 allow the head-worn device to pivot about the x-axis through a desired angle to adjust the front section of the head-worn device at a desired position over a user's eyes, or otherwise at the front of a user's face. As the pivot assemblies 134 are mounted for translation on slides 132 in slots 136, the front section of the head-worn device may also be moved linearly along the z-axis nearer or farther from the user's face.

In embodiments, the pivot assemblies 134 and the frictional clutch 138 may be configured to resist pivoting and translation, respectively, of the head-worn device so that, once manually adjusted by a user, the head-worn device remains in the set position. In one example, the pivot assemblies 134 and the frictional clutch 138 may effectively resist movement of the head-worn device relative to the headband for exerted threshold forces less than 3 g. It is understood that the pivot assemblies 134 and/or frictional clutch 138 may prevent movement for threshold forces which are lesser or greater than 3 g in further embodiments.

Referring now to FIG. 3, another feature of the present technology is to allow mounting and customized adjustment of the head-worn device to minimize localized forces exerted by the head-worn device on the headband 100. For example, unlike conventional HMDs where the head-worn device is mounted to a front of the headband, the head-worn device of the present technology may be affixed to the headband 100 at kinematic assemblies 130 which are located generally centered (front to back) on the headband 100. This serves to distribute the force, f, of the head-worn device at a reference axis 150 evenly around the headband 100, front to back. As shown in FIGS. 1 and 2, the reference axis 150 extends between the two kinematic assemblies, along the x-axis.

Additionally or alternatively, as explained below, the mass of the head-worn device may be distributed so that a center of gravity of the head-worn device may be aligned with the reference axis 150 through the kinematic assemblies 130. This has the effect of minimizing a torque, t, exerted by the head-worn device on the headband 100. All of this improves the weight distribution and overall comfort of the head-worn assembly and headband when in use.

Furthermore, both the crown loop 102 and overhead loop 104 may be made larger or smaller by their respective adjustment mechanisms so that different users can secure the headband 100 to their heads with a custom fit that is most comfortable for them.

Figure 4:
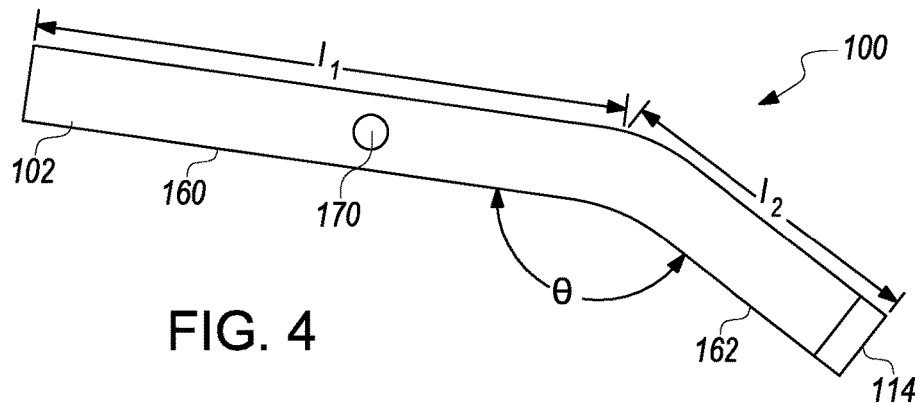
FIGS. 4-9 are side views of alternative embodiments of headbands according to the present technology.

As noted, the headband 100 in accordance with the present technology may have various configurations. Some additional configurations are shown in FIGS. 4-9. In FIG. 4, the headband 100 may be formed of semi-rigid and cushioned materials as described above, forming a crown loop with its ends coming together within the rear headpiece 114 as described above.

Unlike the embodiment of FIG. 1, the headband 100 of FIG. 4 is not generally planar. Instead, it includes a crown loop 102 having a front section 160 and a rear section 162 extending at a discontinuous (other than 180°) angle θ with respect to each other. The discontinuous angle θ allows the front section 160 to be worn higher on a user's head than would a front portion of a planar headband 100. For some users, this may be a more comfortable fit. In embodiments, the angle θ may range between greater than 135° and less than 180°, and may for example be 160°. It is understood that the angle θ may be less than or equal to 135° in further embodiments. The ratio of the length $l_1$ of a front section 160 to the length $l_2$ of rear section 162 may vary in embodiments but may for example be 2:1. In further embodiments, the lengths of the front section 160 and rear section 162 may be equal to each other.

FIG. 4 and FIGS. 5-9 similarly show a mounting position 170 in place of the kinematic assembly 130 described above. The pair of pivot assemblies 134 (not shown in FIGS. 5-10) may be mounted to the headband 100 through the mounting positions 170 (one on either side of headband 100) to enable pivoting of the head-worn device 200 with respect to the headband 100 as described above. However, in the embodiments of FIGS. 4-9, the pair of slides 132 and frictional clutch 138 described above may be omitted. It is understood that some or all of the embodiments of FIGS. 4-9 may also include a pair of slides and frictional clutch 138 as described above to enable both translation and rotation of the head-worn device relative to the headband 100. Alternatively, the slides 132 and frictional clutch may be omitted from the embodiment shown in FIG. 1.

Figure 5:
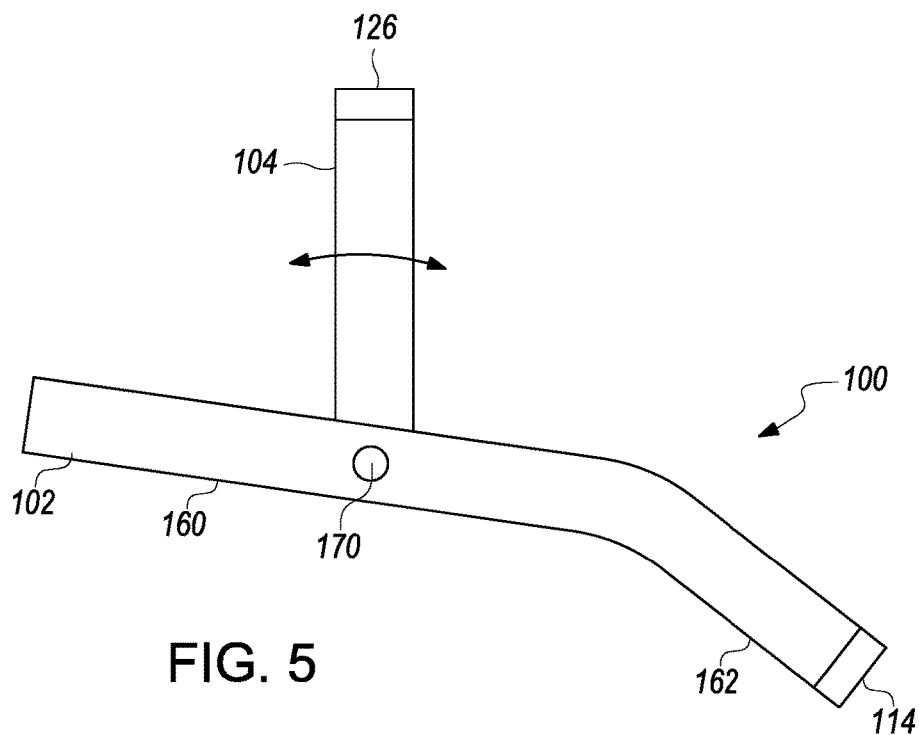
Figure 6:
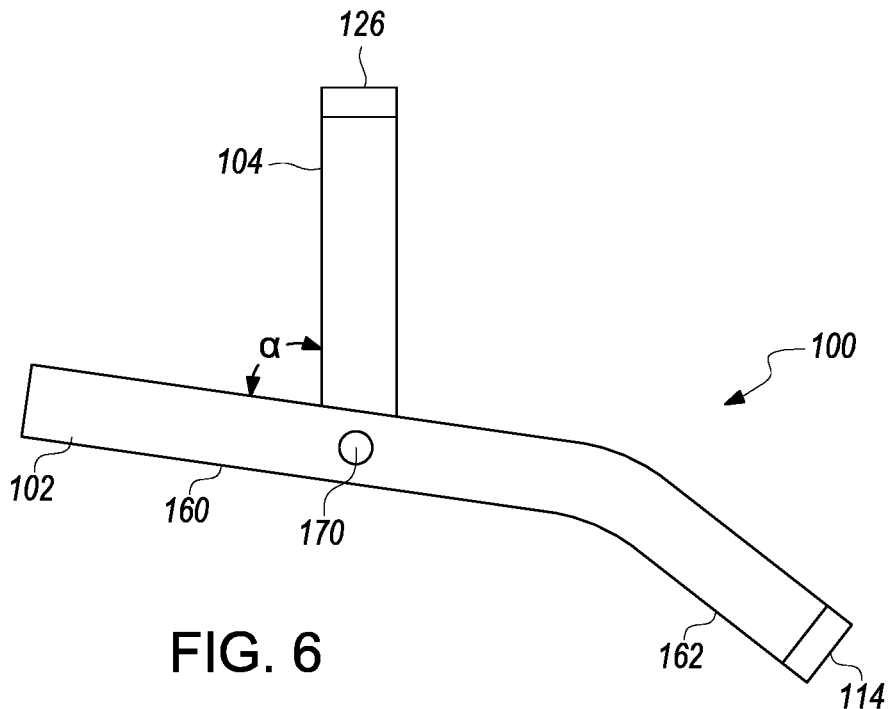

FIG. 5 illustrates a further embodiment of headband 100 having a crown loop 102 similar to that shown in FIG. 4, and further including an overhead loop 104 as described above. In the embodiment of FIG. 5, the straps 104a, 104b may be pivotally mounted to the crown loop 102 via a pair of fasteners on either side of the headband 100 which allows pivoting of the overhead loop 104 relative to the crown loop 102. In further embodiments, the fasteners hold the overhead loop 104 in a fixed position relative to the crown loop 102. The fasteners may be part of the kinematic assemblies 130, the pivot assemblies 134 or separate from these assemblies.

By mounting the overhead loop 104 directly over the mounting positions 170 supporting the head-worn device, the overhead loop 104 is able to directly support a portion of the weight of the head-worn device without the head-worn device exerting a torque on the overhead loop 104. However, in this embodiment and embodiments described hereinafter, the overhead loop 104 be may affixed to the crown loop 102 at positions either in front of or behind the mounting position 170 to which the head-worn device is attached.

Mounting the overhead loop 104 to pivot with respect to the crown loop 102 allows a user to vary the position of the overhead loop 104 on the top of a user's head so that different users can select a custom fit that is most comfortable for them. The angle α between the overhead loop 104 and crown loop 102 may be variable, as in FIG. 5, or fixed, as shown in FIGS. 1-3 and FIG. 6.

Figure 7:
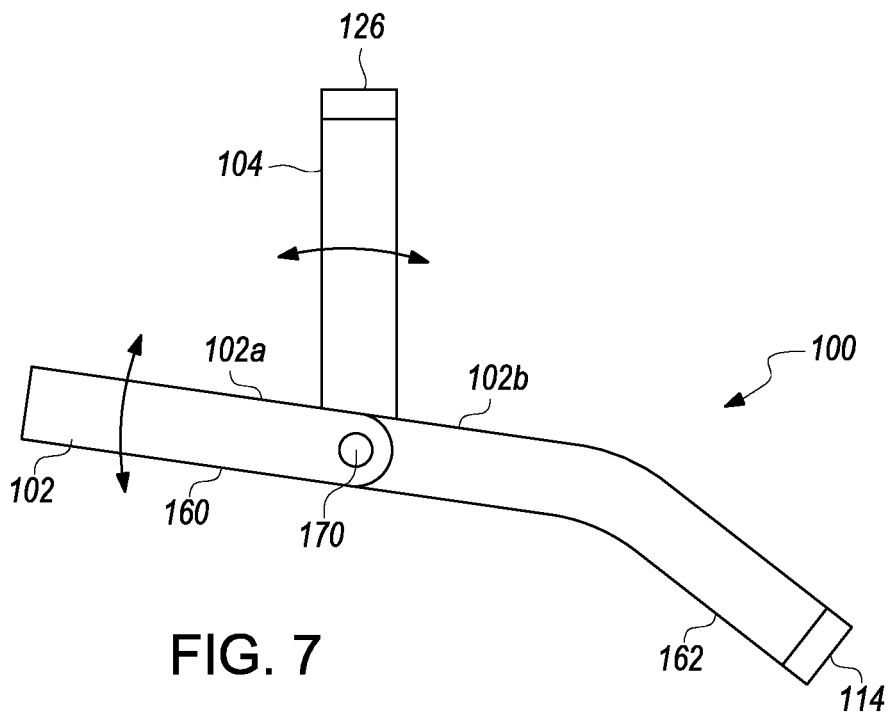

In further embodiments, the crown loop 102 may be separated into a proximal part 102a and a distal part 102b which are pivotally mounted to each other, for example at mounting position 170. Such an embodiment is shown in FIG. 7. In the embodiment shown, each of the proximal part 102a, distal part 102b and overhead loop 104 are angularly adjustable with respect to each other. This provides greater freedom of motion and adjustability of headband 100 to allow different users to secure the headband 100 to their heads with a custom fit that is most comfortable for them.

In further embodiments, the proximal and distal parts 102a, 102b may pivot with respect to each other as shown in FIG. 7, but the overhead loop 104 may be fixedly attached to, and pivot with, one of the proximal and distal parts 102a, 102b. In further embodiments, the crown loop 102 may be planar, as in FIGS. 1-2, and have parts that pivot with respect to each other such as parts 102a, 102b.

Figure 8:
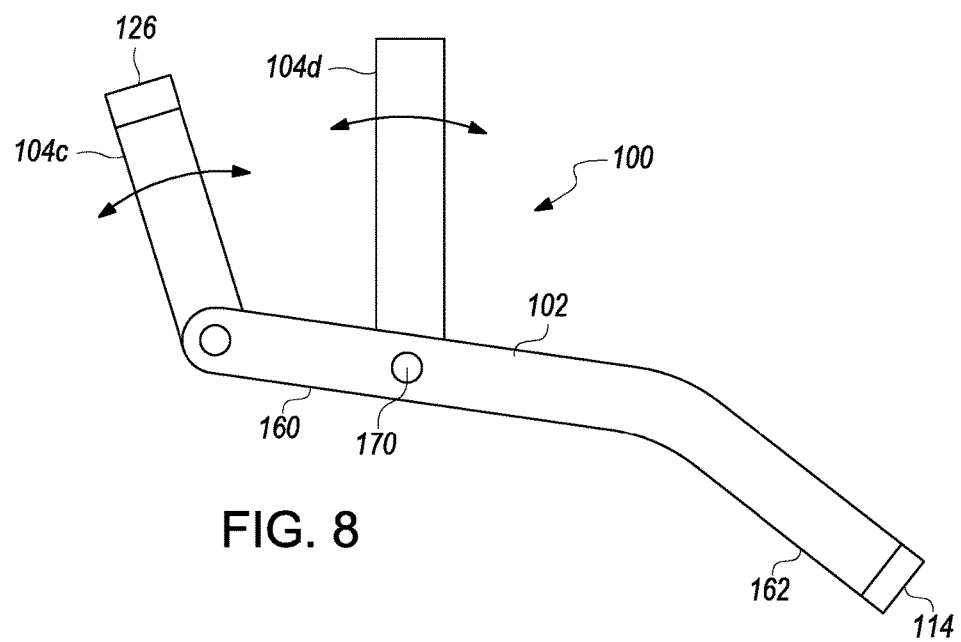
Figure 9:
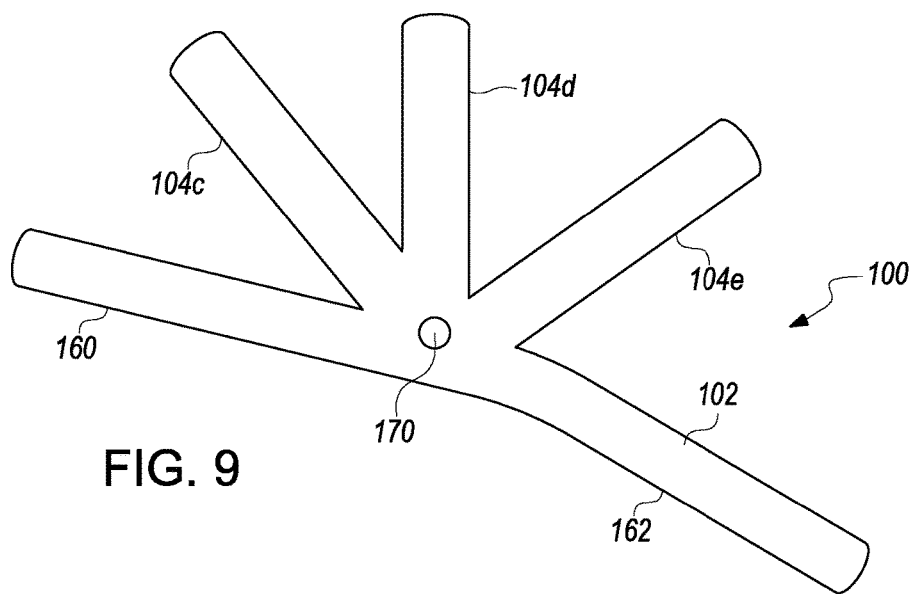

In further embodiments, the headband 100 may include a crown loop 102 and multiple overhead loops 104. An example of such an embodiment is shown in FIGS. 8 and 9. The example of FIG. 8 includes two overhead loops 104c and 104d. The example of FIG. 9 includes three overhead loops 104c, 104d and 104e. There may be greater than three overhead loops 104 in further embodiments.

The overhead loops 104 may affix to the crown loop 102 at different locations, such as shown for example in FIG. 8. In an example, overhead loop 104d mounts at mounting positions 170, while overhead loop 104c mounts forward of that. Overhead loop 104c may mount distally (nearer to the rear headpiece 114) of mounting positions 170 in further embodiments. In further embodiments, two or more of the multiple overhead loops 104 may affix to the crown loop 102 at the same position, at mounting position 170 as shown in FIG. 9, or elsewhere.

One or more of the multiple overhead loops 104 may be pivotally mounted to crown loop 102, as shown in FIG. 8. Similarly, one or more of the multiple overhead loops 104 may be fixedly mounted with respect to the crown loop 102, as shown in FIG. 9. Some of the overhead loops 104 may be pivotally mounted, while others are fixedly mounted in further embodiments. In any of the above-described embodiments of FIGS. 8 and 9, the length of the one or more of the multiple overhead loops 104 may be adjustable via an adjustment mechanism 126 as described above.

Referring now to FIGS. 10-15, a head-worn device 200 may be affixed to the headband 100 at mounting position 170. In the examples that follow, head-worn device 200 is an optical device for presenting a virtual or augmented reality environment to a wearer of device 200. However, as noted above, head-worn device 200 may be other devices in further embodiments.

Where the device 200 presents a virtual or augmented reality environment, the device 200 may in general include an optical assembly positioned in front of the wearer's eyes. The device 200 may further have an operational assembly including processing components, one or more cameras, a power supply and other subassemblies for implementing the virtual or augmented reality environment. As explained below, portions of the operational assembly may be mounted at different locations on the head-worn device 200 or headband 100 to allow for optimal weight distribution and comfort.

FIGS. 10-15 illustrate a head-worn assembly 300 including a headband 100 and a head-worn device 200. While specific examples of the headband 100 are illustrated in each of FIGS. 10-15, it is understood that each of the embodiments described with respect to FIGS. 10-15 may include a headband 100 according to any of the above-described embodiments.

FIG. 10 illustrates an example of head-worn assembly 300 wherein head-worn device 200 includes an optical assembly 202 in a position to be worn in front of a user's eyes, and an operational assembly 204 cooperating with the optical assembly 202 to present a virtual or augmented reality environment to the user. The operational assembly 204 is mounted within a frame 210. Although one side of the frame 210 is shown, the frame 210 extends around the front and both sides of a user's head when the user is wearing assembly 300. As virtual and augmented reality systems generate stereoscopic images displayed to both eyes, the frame 210 supports two operational assemblies, one (shown) for the left eye and another (not shown) for the right eye.

As described above and as shown in the embodiment of FIG. 10, the head-worn device 200 may affix to the headband 100 via a pair of pivot assemblies 134 (shown in FIG. 2 and schematically in FIG. 10). Distal ends of the frame 210 may be affixed to the mounting brackets 140 as described above. As noted, the pivot assemblies 134 may be configured to hold the head-worn device 200 and headband 100 together with a predetermined threshold force such that, unbiased, the head-worn device 200 will remain in a stationary, set position relative to the headband 100. However, a user may apply a manual force larger than the predetermined threshold force to pivot and/or translate the head-worn device 200 relative to the headband 100. Thus, a user may put the head-worn assembly 300 on, manually adjust the head-worn device 200 to the proper and desired position, and thereafter, the head-worn device 200 will stay in that position unless further manually adjusted, or some force exceeding the predetermined threshold force is otherwise applied. In further embodiments, the pivot assemblies 134 and/or slides 132 may be omitted and the head-worn device 200 may be mounted to the headband 100 in a way that prevents relative pivoting and/or translation between the head-worn device 200 and the headband 100 altogether.

In the embodiment of FIG. 10, a first portion of the frame 210 extends forward of the pivot assemblies 134 to support the optical assembly 202 in front of a user's eyes. A second portion of the frame 210 extends rearward of the pivot assemblies 134. The weight of the frame 210, the optical assembly 202 and operational assembly 204 may be distributed around frame 210 so that a center of gravity, $F_{CG}$, of the head-worn device (front to back) is positioned along at the axis 150 through the pivot assemblies 134. In this way, the headband 100 merely supports and distributes the weight of the head-worn device 200. There is no additional torque to be supported by the headband 100 which would otherwise result if the center of gravity of the head-worn device 200 did not align through the pivot assemblies 134. In one example, the weight of the head-worn device 200 supported by the headband may be about 400 grams, though it may be heavier or lighter than that in further embodiments. As explained hereinafter, the center of gravity of the head-worn device need not align through the pivot assemblies 134 in further embodiments.

The weight of the head-worn device 200 may be distributed around frame 210 (front to back) to align the center of gravity, $F_{CG}$, of the head-worn device with the axis 150 through pivot assemblies 134 in a number of ways. In embodiments, the head-worn device extends farther forward of pivot assemblies 134 than rearward of pivot assemblies 134. In such embodiments, a greater proportion of the weight of the head-worn device 200 may be positioned rearward of the pivot assemblies 134 so as to align the center of gravity through the pivot assemblies 134. As one example, some components 204a of the operational assembly 204, such as the processing components and/or power supply (which may be one or more batteries), may be positioned rearward of the pivot assemblies 134. These components may be proportionately heavier than others in the operational assembly 204 so that the net moment forces of the head-worn assembly resolve to a position over the axis 150 through the pivot assemblies 134. While it may be undesirable to make the head-worn device 200 heavier than necessary, it is conceivable that the frame 210 may include ballast weight rearward of the pivot assemblies 134 so that the center of gravity is centered at the axis 150 through pivot assemblies 134.

In embodiments, portions of the head-worn device may be distributed onto the headband 100. For example, FIG. 11 illustrates a further embodiment of the present technology where components 204a of the operational assembly 204 such as the processing components and/or power supply may be mounted at or as part of the rear headpiece 114 of the crown loop 102 of the headband 100. These components 204a may be mounted in such a way that the headband 100 may still be made larger or smaller by the adjustment mechanism 126 within the rear headpiece 114. Alternatively, the adjustment mechanism for the crown loop 102 may be positioned elsewhere on the crown loop, or omitted, in further embodiments.

In the embodiment of FIG. 11, the pivot assemblies 134 may be replaced by another fastener that prevents relative pivoting between head-worn device 200 and headband 100. Alternatively, the pivot assemblies 134 may be provided so that, unbiased, the head-worn device 200 remains stationary relative to the headband 100 unless and until a force above the predetermined threshold force is applied to pivot the head-worn device 200 relative to headband 100. With the head-worn device 200 and headband 100 held together, the weight of different components may be distributed so that the center of gravity of the head-worn assembly 300 as a whole is centered over the axis through the pivot assemblies 134.

Figure 12:
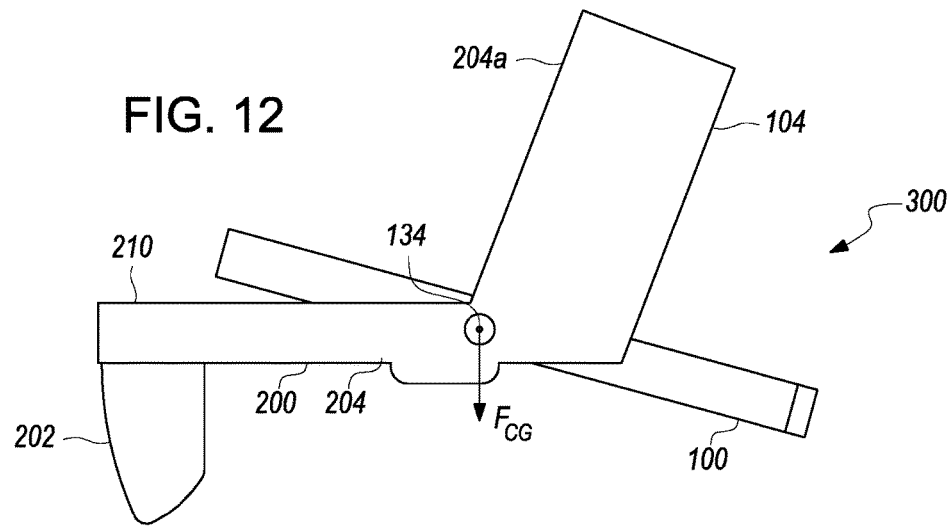

FIG. 12 is another example where components 204a of the head-worn device 200 may be distributed on the headband 100. In this example, components 204a of the head-worn device 200 such as the processing components and/or power supply may be affixed as part of the overhead loop 104 of the headband 100. The overhead loop 104 including components 204a may be formed integrally with the frame 210, or otherwise attached to frame 210. In this embodiment, the pivot assemblies 134 may allow for relative motion between the head-worn device 200 and the headband 100, or some other fastener may be used to prevent relative movement. As above, the weight of components 204a may be distributed so that the center of gravity of the head-worn assembly 300 as a whole may be centered over the axis through the pivot assemblies 134.

Figure 13:
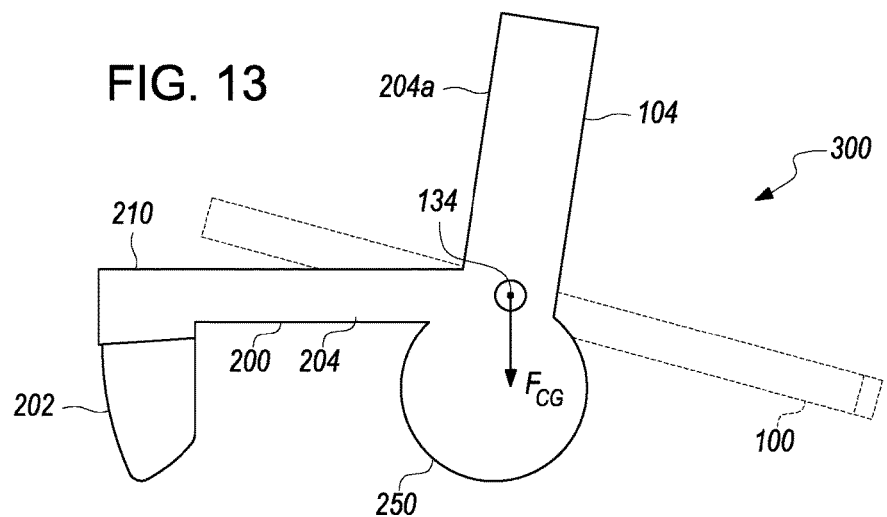

The embodiment of FIG. 13 is similar to the embodiment of FIG. 12, with the further addition that components 204a may include headphones 250. One earpiece of headphones 250 is shown, but two earpieces may be provided, one for each ear, for example at the ends of the overhead loop 104 of headband 100. In addition to providing audio, the headphones 250 rest over a user's ears, and provide additional surface area in contact with the head of a user over which the weight of the head-worn assembly 300 may be distributed. This further promotes comfort of the head-worn assembly 300. Headphones 250 may be incorporated into any of the above-described embodiments.

Figure 14:
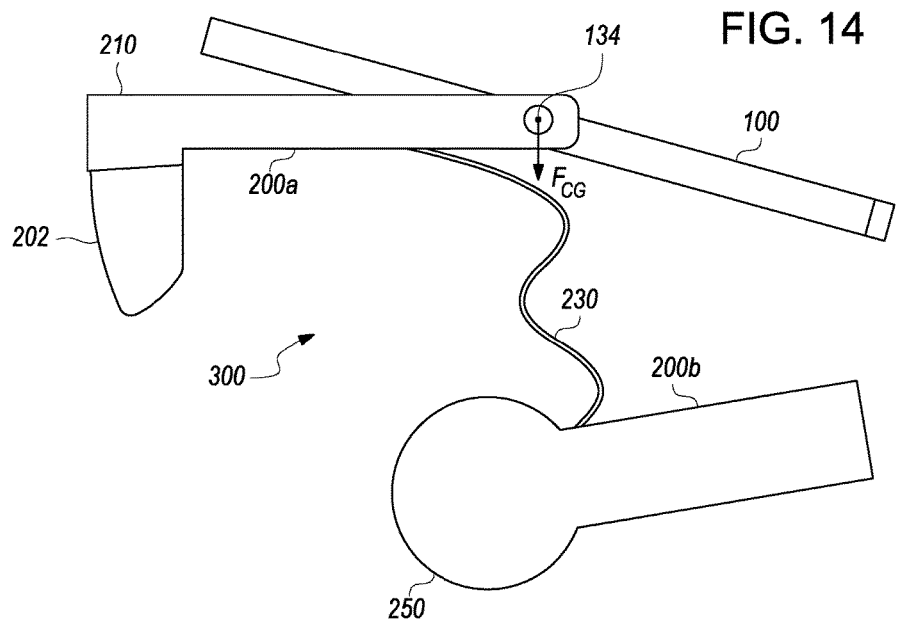

In further embodiments, portions of the head-worn device 200 may be physically separated from the head-worn assembly 300. For example, FIG. 14 illustrates an example where the head-worn device includes unit 200a and 200b. Unit 200a may be affixed to the headband 100 and may include the optical assembly 202. Components such as the processing components and/or power supply may be in the standalone unit 200b. In such an example, control signals and/or power may be communicated between the units 200a and 200b by a cord 230. In further embodiments, for example where the power supply is in unit 200a, or where both units 200a and 200b include power supplies, cord 230 may be omitted and signals may be communicated between the units 200a and 200b wirelessly.

In embodiments, the standalone unit 200b may be a rectangular or other shaped device held in a pocket or worn on an arm or waistband of a user. In further embodiments (as shown in FIG. 14), the headphones 250 may also be incorporated as part of the standalone unit 200b. In such an embodiment, the standalone unit 200b may be shaped with an overhead portion adapted to fit over a user's head with the pair of earpieces fitting over the user's ears when worn. When the headphones are not in use, the standalone unit 200b may be worn around a user's neck. Separating the head-worn device 200 into units 200a and 200b decreases the amount of weight supported by the headband 100 on a user's head, and further promotes long-term comfort.

Figure 15:
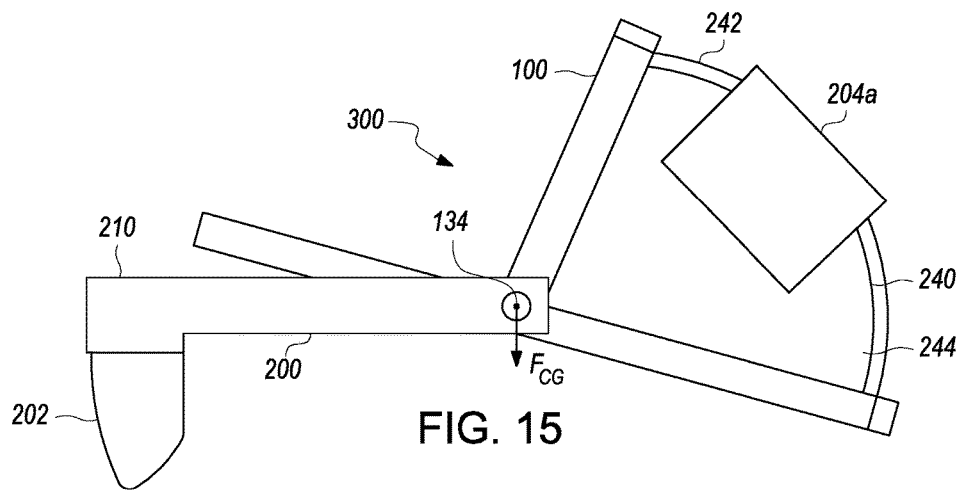

FIG. 15 illustrates a further embodiment where the headband 100 is augmented to include a partial cap 240 for supporting components 204a of the head-worn device 200. The partial cap 240 may include a support 242 extending backward between the overhead loop 104 and the crown loop 102. The partial cap 240 may further include hard or soft material 244 forming approximately one half of a hemisphere, so that the back of a user's head is enclosed by the head-worn assembly 300 when in use. As above, the weight of components in FIG. 15 may be distributed so that the center of gravity of the head-worn assembly 300 as a whole is centered over the axis through the pivot assemblies 134.

It is understood that features from the various embodiments described above with respect to FIGS. 10-15 may be combined and interchanged with other features described with respect to FIGS. 1-9, and vice-versa.

In embodiments described above, weight distribution and comfort of the head-worn assembly 300 may be optimized by mounting the head-worn device 200 centrally between front and rear portions of the headband 100. This position may be at, or behind by a centimeter or so, an approximate center of gravity of a user's head (front to back). Additionally or alternatively, weight distribution and comfort may be optimized by balancing the weight of the head-worn device 200 (front to back) over the mounting position to the headband. It is understood that head-worn device 200 may be mounted forward or rearward of the center of gravity of the user's head (front to back) in further embodiments, for example by as much as 5 cm, though this deviation from the center of gravity may be lesser or greater than that in further embodiments. It is also understood that the center of gravity of the head-worn device 200 need not align over its mounting position in further embodiments, and may for example deviate forward or rearward of its mounting position by as much as 5 cm. Again, this deviation may be lesser or greater in further embodiments.

The weight distribution and comfort of the head-worn assembly may be further optimized by providing several user-customizable adjustments to the head-worn assembly. These user-customizable adjustments include a linear slide adjusting the forward/rear position of the head-worn assembly relative to the z-axis, and adjustment of the crown and/or overhead loops to different sizes.

In at least some of the embodiments described above, the head-worn device 200 does not serve in supporting the head-worn assembly 300 on the user's head. That function is performed by headband 100 in these embodiments. In further embodiments, the task of supporting the head-worn assembly 300 on a user's head may be shared by both the head-worn device 200 and the headband 100. One such example is shown in FIGS. 16-18.

Figure 16:
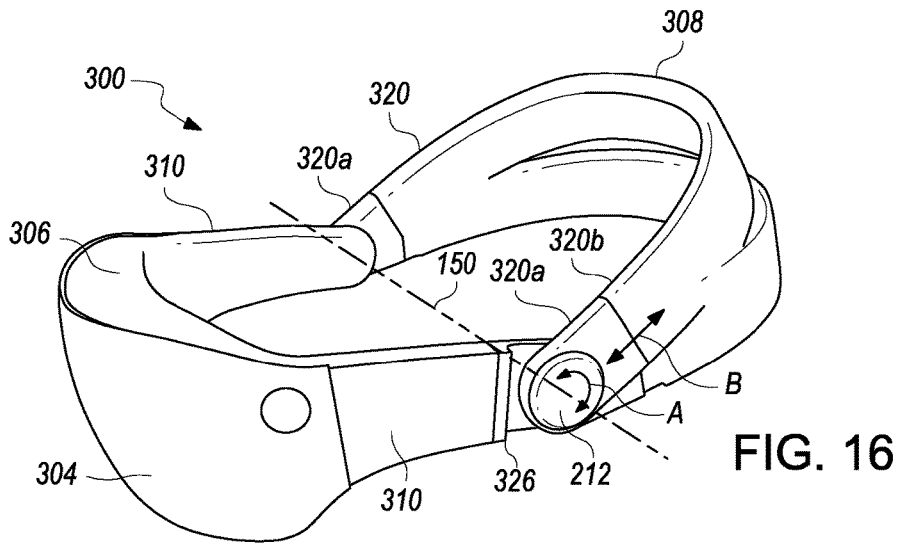
FIGS. 16-18 are perspective views of a further embodiment of a head-worn assembly according to the present technology.
Figure 17:
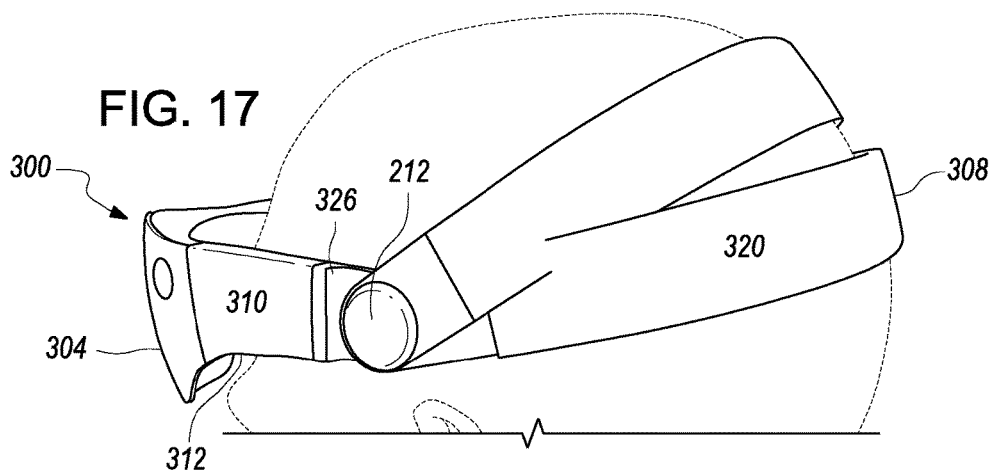
Figure 18:
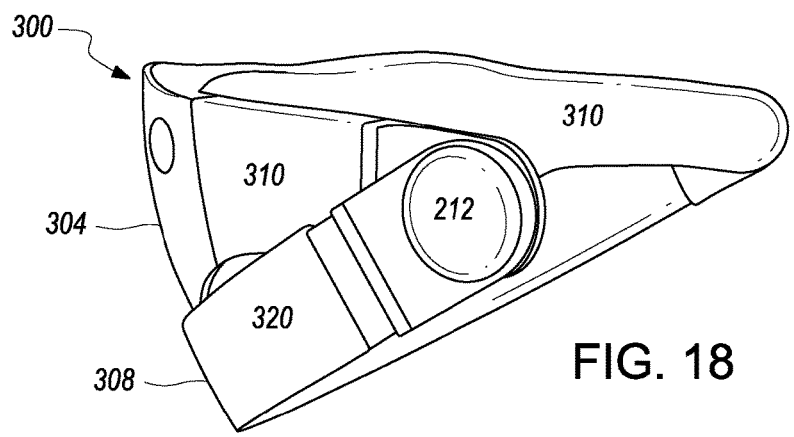

FIGS. 16-18 illustrate a head-worn assembly 300 including a front portion 304 and a rear portion 308. In embodiments, front portion 304 may include an enclosure 306 for housing the above-described components and assemblies of the head-worn device 200. However, some of the components of the head-worn device 200 may be included in the rear portion 308 in further embodiments. In this way, the weight of the head-worn assembly 300 may be evenly distributed front to back, and the location of the center of gravity front to back may be controlled as desired relative to the reference axis 142.

Where the head-worn assembly 300 provides an augmented reality experience, the front portion of enclosure 306 may be at least semitransparent. Where the head-worn assembly 300 provides just a virtual reality experience, the front portion of the enclosure 306 may be opaque.

Front portion 304 may include a pair of temple arms 310 for engaging and being supported on the temples of a user. Front portion 304 may further include a bridge 312 (FIG. 17) for engaging and being supported on the bridge of a user's nose. Rear portion 308 may be comprised of a band 320 that is mounted to the temple arms 310 via a pivot assembly such as pivot assembly 134 described above. In embodiments, the rear portion 308 may include a single band 320. FIGS. 16 and 17 illustrate a single band 320 at different positions at different times to illustrate how the band 320 may pivot with respect to the temple arms 310. However, in further embodiments not shown, rear portion 308 may include more than one band 320, such as for example one adapted to go around a user's head, and another adapted to go over a user's head.

As described above, the pivot assembly 134 may hold the band 320 and temple arms together with a predetermined threshold force to remain in a fixed relation to each other unless and until a pivoting force in excess of the predetermined threshold force is applied. Upon application of a force above the threshold force, the band 320 may pivot about reference axis 150 in the direction of arrow A. The band 320 may rotate over a range of 270° in embodiments, though it may be more or less than that in further embodiments.

Each temple arm 310 may be equipped with a lip 326 which limits rotation of the band 320 in both clockwise and counterclockwise directions. In further embodiments, the lip 326 on each temple arm may be omitted, and some other portion of the enclosure 306 may limit the clockwise and counterclockwise rotation of the band 320. FIG. 18 illustrates the band 320 rotated clockwise to its fullest extent. Such a position may be convenient for stowing and/or transporting the head-worn device 200.

The band 320 may also include telescoping sections 320a and 320b which can linearly translate with respect to each other in the direction of arrow B to increase the size of band 320 and the overall circumference of the front and rear portions 304, 308 together. Each side of the rear portion 308 may include a section 320a, and the section 320b may extend between them.

Sections 320a and 320b may telescope with respect to each other according to a variety of known techniques. For example, section 320a may have a slightly smaller size so as to fit within section 320b. The section 320a may fit snugly within the section 320b so that the sections remain in a fixed position with respect to each other unless a force is applied overcoming the force of static friction between the sections 320a and 320b. In a further embodiment, a frictional clutch as described above may be provided between the respective sections 320a and 320b. Such mechanisms may hold the sections in a fixed position with respect to each other unless a force is applied sufficient to move section 320b closer to or further away from section 320a.

In the embodiment of FIGS. 16-18, the front portion 304 may be supported on the user's nose and temples, and the rear portion 308 may be supported at user-selected angles and sizes on the user's head, to provide a comfortable fit of the head-worn assembly 300. The temple arms 310 and band 320 may be formed of the same semi-rigid material 108 as headband 100 described above. Portions of the temple arms 310 and band 320 may also include a soft cushioning material 112 as described above for headband 100.

As noted above, in one example the head-worn assembly 300 may be used for creating virtual and augmented reality environments. FIG. 19A is a block diagram depicting example components of a personal audiovisual (AN) apparatus 500 including a head-worn assembly 300 in the form of a virtual or augmented reality HMD 502. Personal A/V apparatus 500 includes an optical see-through, augmented reality display device as a near-eye, augmented reality display device or HMD 502 in communication with a companion processing module 504 via a wire 506 in this example or wirelessly in other examples. In this embodiment, HMD 502 is in the shape of eyeglasses having a frame 515 which may be the same as frame 210 described above. Frame 515 provides a support structure for holding elements of the HMD in place as well as a conduit for electrical connections. In this embodiment, frame 515 may include a microphone 510 for recording sounds and transmitting audio data to control circuitry 536.

The HMD 502 further includes display optical systems 514*l* for the left eye and 514*r* for the right eye (collectively, optical systems 514). Image data is projected from optical systems 514 into a user's eye to generate a display of the image data while a user also sees through the display optical systems 514 for an actual direct view of the real world.

The companion processing module 504 may have different configurations in different embodiments. In some embodiments, companion processing module 504 is a separate unit which may be worn on the user's body (e.g. a wrist) or be a separate device like a mobile device (e.g. a smartphone). The companion processing module 504 may communicate wired or wirelessly (e.g., WiFi, Bluetooth, infrared, an infrared personal area network, RFID transmission, wireless Universal Serial Bus (WUSB), cellular, 3G, 4G or other wireless communication means) over one or more communication networks 560 to one or more computer systems 512, whether located nearby or at a remote location. The companion processing module 504 may also communicate with other personal A/V apparatus 508 in another location or environment via network 560.

Figure 22:
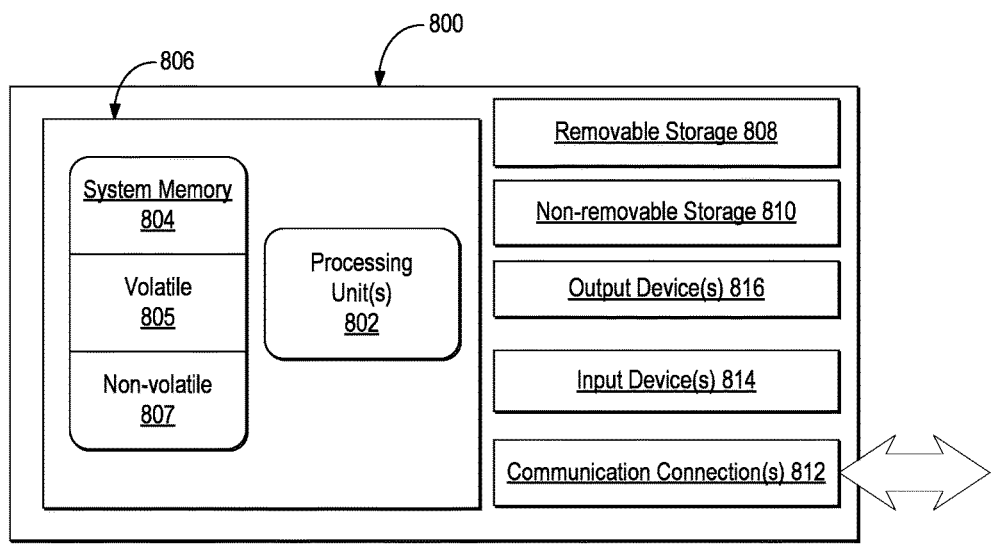
FIG. 22 illustrates is a block diagram of one embodiment of a computing system that can be used to implement a network accessible computing system or a companion processing module.

In other embodiments, the functionality of the companion processing module 504 may be integrated in software and hardware components of the HMD 502 as in FIG. 19B. In this embodiment, the control circuitry 536 of the HMD 502 incorporates the functionality which a companion processing module 504 provides in FIG. 19A and communicates wirelessly via a wireless transceiver (see wireless interface 537 in FIG. 20A) over a communication network 560 to one or more computer systems 512, other personal A/V apparatus 508 and, if available, a 3D image capture device in the environment. Some examples of hardware components of the companion processing module 504 and computer system 512 are shown in FIG. 22 described below. The scale and number of components may vary considerably for different embodiments of the computer system 512 and the companion processing module 504.

An application may be executing on a computer system 512 which interacts with or performs processing for an application executing on one or more processors in the personal A/V apparatus 500. For example, a 3D mapping application may be executing on one or more computers systems and the user's personal A/V apparatus 500.

In the illustrated embodiments of FIGS. 19A and 19B, the one or more computer system(s) 512 and the personal A/V apparatus 500 also have network access to one or more 3D image capture devices 520 which may be, for example one or more cameras that visually monitor one or more users and the surrounding space such that gestures and movements performed by the one or more users, as well as the structure of the surrounding space including surfaces and objects, may be captured, analyzed, and tracked. Image data, and depth data if captured, of the one or more 3D capture devices 520 may supplement data captured by one or more capture devices 613 on the HMD 502 and other personal A/V apparatus 508. Data from any or all of these components may be used for 3D mapping, gesture recognition, object recognition, resource tracking, and other functions as discussed further below.

Figure 20A:
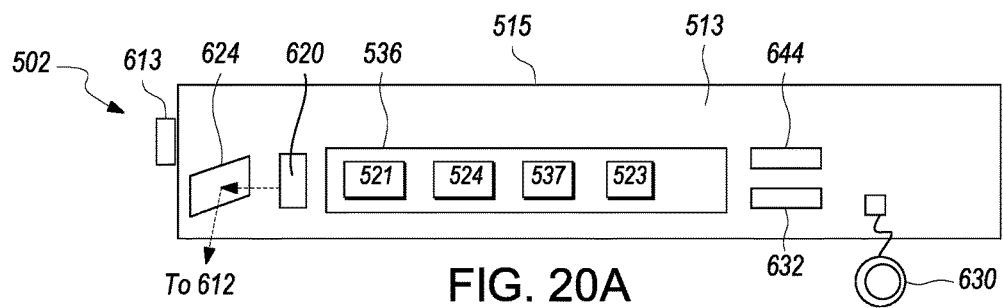
FIG. 20A is a side view of an HMD having a temple arm with a near-eye augmented/virtual reality display and other electronic components.
Figure 20B:
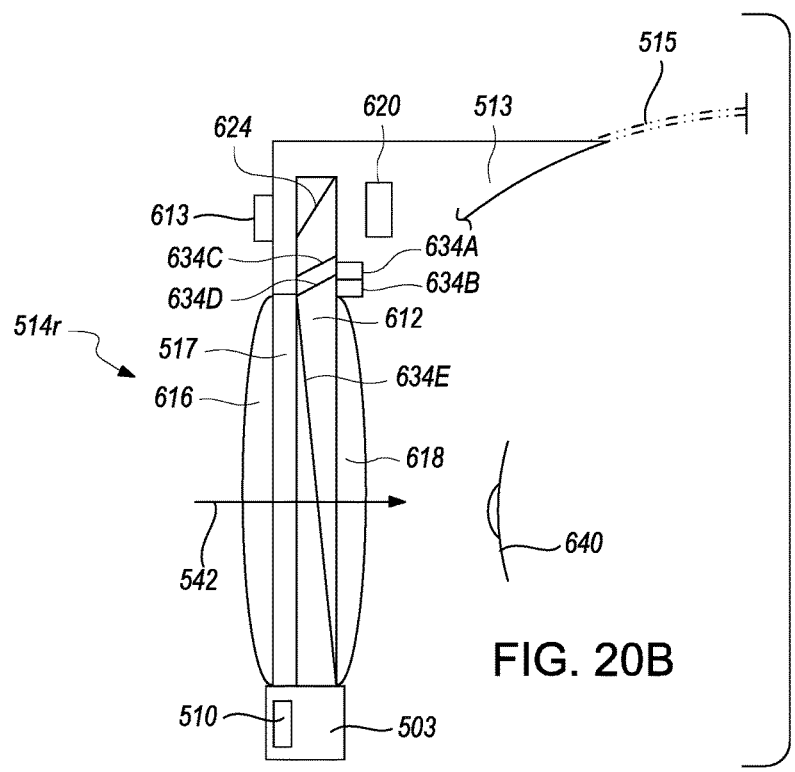
FIG. 20B is a top partial view of an HMD having a temple arm with a near-eye augmented/virtual reality display and other electronic components.

FIGS. 20A and 20B illustrate side and top views, respectively, of additional components of HMD 502. The described components are provided on each of the left and right portions 513 of the frame 515 for presenting stereoscopic images to the left and right eyes. As shown, each side of frame 515 may include an image generation unit 620 described below, and outward facing capture device 613, e.g., a camera, for recording digital image data such as still images, videos or both. The images captured in each capture device 613 may be transmitted to the control circuitry 536 which may in turn send the captured image data to the companion processing module 504 (FIG. 19A). In some examples, the capture devices 613 may also be depth sensitive, for example, they may be depth sensitive cameras which transmit and detect infrared light from which depth data may be determined.

Control circuitry 536 provides various electronics that support the other components of HMD 502. In this example, one of the left and right portions 513 may include control circuitry 536 for HMD 502. Control circuitry 536 may include a processing unit 521, a memory 524 accessible to the processing unit 521 for storing processor readable instructions and data, a wireless interface 537 communicatively coupled to the processing unit 521, and a power supply 523 providing power for the components of the control circuitry 536 and the other components of HMD 502 like the capture devices 613, the microphone 510 and the sensor units discussed below. The processing unit 521 may comprise one or more processors including a central processing unit (CPU) and a graphics processing unit (GPU).

Inside or mounted to one side portion 513 of HMD 502 is a headphone or a set of headphones 630, an inertial sensing unit 632 including one or more inertial sensors, and a location sensing unit 644 including one or more location or proximity sensors, some examples of which are a GPS transceiver, an infrared (IR) transceiver, or a radio frequency transceiver for processing RFID data.

Each of the side portions 513 may further include an image source or image generation unit 620 which produces visible light representing images. The image generation units 620 can display a virtual object to appear at a designated depth location in the display field of view to provide a realistic, in-focus three dimensional display of a virtual object which can interact with one or more real objects.

In some embodiments, the image generation unit 620 includes a microdisplay for projecting images of one or more virtual objects, and lens or other coupling optics for directing images from the microdisplay to a reflecting element 624. The reflecting element 624 directs the light from the image generation unit 620 into a light guide optical element 612, which directs the light representing the image into the user's eye.

In the illustrated embodiment, the display optical system 514 may be an integrated eye tracking and display system. In the illustrated embodiment, each display optical system 514 includes an opacity filter 517. Opacity filter 517 selectively blocks natural light from passing through light guide optical element 612 for enhancing contrast of virtual imagery. The opacity filter 517 is aligned behind an optional see-through lens 616. The opacity filter 527 is aligned in front of a light guide optical element 612 for projecting image data from the image generation unit 620. An optional see-through lens 618 is aligned behind the light guide optical element 612.

Light guide optical element 612 may be a planar waveguide for transmitting light from image generation unit 620 to the eye 640 of a user wearing HMD 502. Light guide optical element 612 is at least partially transparent to allow light from in front of HMD 502 to be received through light guide optical element 612 by eye 640, as depicted by an arrow representing an optical axis 542 of the display optical system 514r. This allows a user to have an actual direct view of the space in front of HMD 502 in addition to receiving a virtual image from image generation unit 620. In embodiments providing a purely virtual experience, light guide optical element 612 may be opaque. A representative reflecting element 634E represents the one or more optical elements, such as mirrors, gratings, and other optical elements, which direct visible light representing an image from the planar waveguide towards the eye 640.

Infrared illumination and reflections also traverse the planar waveguide for an eye tracking system 634 for tracking the position and movement of the user's eye, typically the user's pupil. Eye movements may also include blinks. The tracked eye data may be used for applications such as gaze detection, blink command detection and gathering biometric information indicating a personal state of being for the user. The eye tracking system 634 comprises an eye tracking IR illumination source 634A (an infrared light emitting diode (LED) or a laser (e.g. VCSEL)) and an eye tracking IR sensor 634B (e.g. IR camera, arrangement of IR photodetectors, or an IR position sensitive detector (PSD) for tracking glint positions).

In this embodiment, representative reflecting element 634E also implements bidirectional infrared (IR) filtering which directs IR illumination towards the eye 640, preferably centered about the optical axis 542 and receives IR reflections from the eye 640. A wavelength selective filter 634C passes through visible spectrum light from the reflecting surface or element 624 and directs the infrared wavelength illumination from the eye tracking illumination source 634A into the planar waveguide. Wavelength selective filter 634D passes the visible light and the infrared illumination in an optical path direction heading towards the nose bridge 503. Wavelength selective filter 634D directs infrared radiation from the waveguide including infrared reflections of the eye 640, preferably including reflections captured about the optical axis 542, out of the light guide optical element 612 embodied as a waveguide to the IR sensor 634B.

Again, FIGS. 20A and 20B show half of HMD 502. For the illustrated embodiment, a full HMD 502 may include another display optical system 514 and components described herein.

Figure 21:
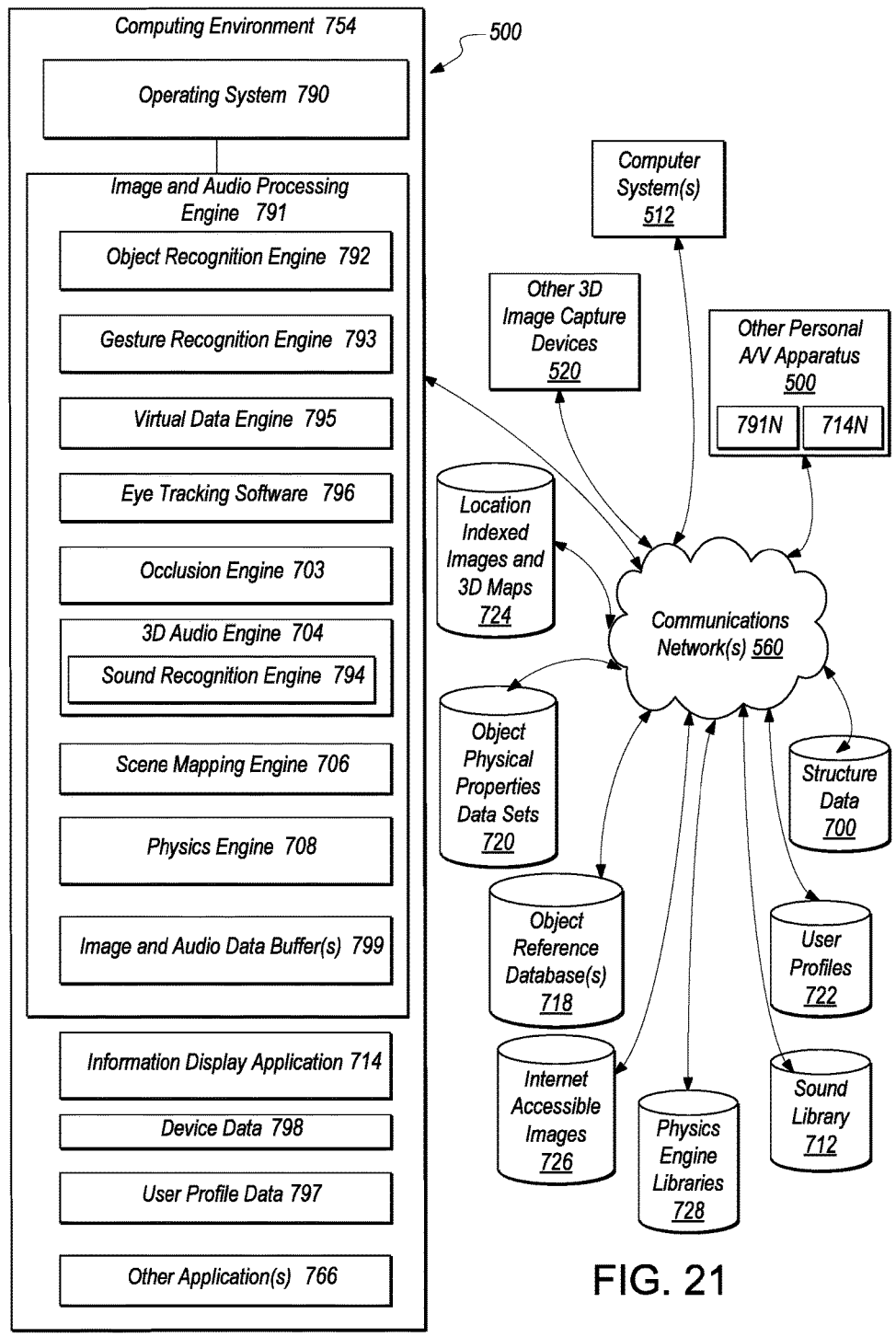
FIG. 21 illustrates a block diagram of a system from a software perspective for representing a physical location at a previous time period with three dimensional (3D) virtual data being provided by a near-eye augmented/virtual reality display of an HMD.

FIG. 21 is a block diagram of a system from a software perspective for displaying three dimensional (3D) virtual data by an A/V apparatus 500. FIG. 21 illustrates a computing environment 754 which may be implemented by a system like A/V apparatus 500, one or more remote computer systems 512 in communication with one or more remote A/V apparatus or a combination of these. The software components of the computing environment 754 comprise an image and audio processing engine 791 in communication with an operating system 790. Image and audio processing engine 791 processes image data (video or still) and audio data in order to support applications executing for an HMD system like the A/V apparatus 500. Information display application 714 is an example of one such application.

The information display application 714 executing in the A/V apparatus 500 or remotely on a computer system 512 for the A/V apparatus 500 leverages the various engines of the image and audio processing engine 791 for implementing its one or more functions by sending requests identifying data for processing and receiving notification of data updates. For example, notifications from the scene mapping engine 706 identify the positions of virtual and real objects at least in the display field of view. The information display application 714 identifies data to the virtual data engine 795 for generating the structure and physical properties of an object for display. The information display application 714 may supply and identify a physics model for each virtual object generated for its application to the physics engine 708, or the physics engine 708 may generate a physics model based on an object physical properties data set 720 for the object.

Image and audio processing engine 791 processes data such as image data, depth data and audio data received from one or more capture devices. Image and depth information may come from the outward facing capture devices 613 captured as the user moves his head or body, and additionally from other A/V apparatus 508, other 3D image capture devices 520 and image data stores like location indexed images and maps 724.

Image and audio processing engine 791 includes object recognition engine 792, gesture recognition engine 793, virtual data engine 795, eye tracking software 796 if eye tracking is in use, an occlusion engine 703, a 3D positional audio engine 704 with a sound recognition engine 794, a scene mapping engine 706, and a physics engine 708 which may communicate with each other. The computing environment 754 also stores data in image and audio data buffer(s) 799.

Various engines are provided as part of the image and audio processing engine 791 for recognizing predefined gestures and speech, as well as other discernable and useful traits from the user. The gesture recognition engine 793 recognizes predefined gestures. The sound recognition engine 794 recognizes predefined sounds, words and phrases. The eye tracking software 796 detects eye data such as a position of a pupil or an eye movement like a blink sequence. This information is made available to information display application 714 by the operating system 790. The device data 798 makes available to the information display application 714 location data, head position data, data identifying an orientation with respect to the ground and other data from sensing units of the HMD 502.

The positions of objects are provided to the information display application 714 by the scene mapping engine 706. A sound to be played for the user in accordance with the information display application 714 can be uploaded to a sound library 712 and identified to the 3D audio engine 704 with data identifying from which direction or position to make the sound seem to come from.

A depth map representing the positions of real and virtual objects in the field of view of the HMD 502 can be developed from outward facing capture devices 613. A view dependent coordinate system may be used for the mapping of the display field of view approximating a user perspective. The scene mapping engine 706 determines a 3D mapping of the display field of view of the HMD 502 based on captured image data and/or depth data. The 3D mapping includes 3D space positions or position volumes for objects. Virtual objects can be inserted into the depth map under control of an application like information display application 714.

Mapping what is around the user in the user's environment can be aided with sensor data. Data from an orientation sensing unit 632, e.g. a three axis accelerometer and a three axis magnetometer, determines position changes of the user's head and correlation of those head position changes with changes in the image and depth data from the front facing capture devices 613 can identify positions of objects relative to one another and at what subset of an environment or location a user is looking.

In some embodiments, the scene mapping engine 706 executing on the network accessible computer systems 512 updates a centrally stored 3D mapping of a location in which the AN apparatus 500 is used. HMD 502 may download updates and determine changes in objects in their respective display fields of views based on the map updates. Image and depth data from multiple perspectives can be received in real time from other 3D image capture devices 520 under control of one or more network accessible computer systems 512 or from one or more A/V apparatus 500 in the location. Overlapping subject matter in the depth images taken from multiple perspectives may be correlated based on a view independent coordinate system, and the image content combined for creating the volumetric or 3D mapping of a location (e.g. an x, y, z representation of a room, a store space, a geofenced area, etc.). Additionally, the scene mapping engine 706 can correlate the received image data based on capture times for the data in order to track changes of objects and lighting and shadow in the location in real time.

The registration and alignment of images allows the scene mapping engine to be able to compare and integrate real-world objects, landmarks, or other features extracted from the different images into a unified 3D map associated with the real-world location.

The location may be identified by location data which may be used to search in location indexed image and pre-generated 3D maps 724 or in Internet accessible images 726 for a map or image related data which may be used to generate a map. For example, location data such as GPS data from a GPS transceiver of the location sensing unit 644 on an HMD 502 may identify the location of the user. Additionally, an IP address of a WiFi hotspot or cellular station to which the A/V apparatus 500 has a connection can identify a location. The location of the A/V apparatus 500 may be identified other ways. Maps and map updates, or at least object identification data may be exchanged between A/V apparatus via infra-red, Bluetooth or WUSB as the range of the signal allows.

The scene mapping engine 706 identifies the position and tracks the movement of real and virtual objects in the volumetric space based on communications with the object recognition engine 792 and one or more executing applications generating virtual objects. The object recognition engine 792 detects, tracks and identifies real objects in the display field of view and the 3D environment of the user based on captured image data and captured depth data. Besides identifying the type of object, an orientation of an identified object may be detected based on the comparison with stored structure data 700, object reference data sets 718 or both.

One or more databases of structure data 700 accessible over one or more communication networks 560 may include structural information about objects. As in other image processing applications, a person can be a type of object, so an example of structure data is a stored skeletal model of a human which may be referenced to help recognize body parts. Structure data 700 may also include structural information regarding one or more inanimate objects in order to help recognize the one or more inanimate objects, some examples of which are furniture, sporting equipment, automobiles and the like.

The object recognition engine 792 may also perform facial and pattern recognition on image data of the objects based on stored image data from other sources as well, such as user profile data 797 of the user, other users' profile data 722 which are permission and network accessible, location indexed images and 3D maps 724 and Internet accessible images 726.

FIG. 22 is a block diagram of one embodiment of a computing system that can be used to implement one or more network accessible computer systems 512 or a companion processing module 504 which may host at least some of the software components of computing environment 754 or other elements depicted in FIG. 21. With reference to FIG. 22, an exemplary system includes a computing device, such as computing device 800. In a basic configuration, computing device 800 typically includes one or more processing units 802 including one or more central processing units (CPU) and one or more graphics processing units (GPU). Computing device 800 also includes system memory 804. Depending on the exact configuration and type of computing device, system memory 804 may include volatile memory 805 (such as RAM), non-volatile memory 807 (such as ROM, flash memory, etc.) or some combination of the two. This basic configuration is illustrated in FIG. 22 by dashed line 806. Additionally, device 800 may also have additional features/functionality. For example, device 800 may also include additional storage (removable and/or non-removable) including, but not limited to, magnetic or optical disks or tape. Such additional storage is illustrated in FIG. 22 by removable storage 808 and non-removable storage 810.

Device 800 may also contain communication connection(s) 812 such as one or more network interfaces and transceivers that allow the device to communicate with other devices. Device 800 may also have input device(s) 814 such as keyboard, mouse, pen, voice input device, touch input device, etc. Output device(s) 816 such as a display, speakers, printer, etc. may also be included. These devices are well known in the art so they are not discussed at length here.

Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

We claim:

1. A head-worn assembly, comprising:
a headband configured to be worn by a user, the headband comprising a proximal part and a distal part, the proximal part extending from a first mounting position of the headband and configured to fit around a front of the head to a second mounting position of the headband, the proximal part including elongated tracks, the distal part extending from the first mounting position and configured to fit around a back of the head to the second mounting position, the first and second mounting positions configured to be located on opposite sides of the head and defining a reference axis passing in between the first and second mounting positions;

kinematic assemblies transitionally and pivotally mounted to the first and second mounting positions of the headband, the kinematic assemblies comprising slides mounted to the elongated tracks, the slides engaging a frictional clutch configured to cause translation of the kinematic assemblies within the elongated tracks;

a frame affixed to the headband at the kinematic assemblies and configured to extend from the first mounting position around the front of the head to the second mounting position;

an optical assembly for presenting an image, the optical assembly mounted on the frame and configured to be positioned in front of the head; and an operational assembly distributed on the head-worn assembly such that weights of the frame, the optical assembly, and the operational assembly are balanced at the reference axis.

2. The head-worn assembly of claim 1, the headband comprising a crown loop adapted to extend around a crown of the head.

3. The head-worn assembly of claim 2, the headband further comprising an overhead loop affixed to the crown loop and adapted to extend over a top of the head.

4. The head-worn assembly of claim 3, wherein the frame is pivotally affixed to the kinematic assemblies at the first and second mounting positions.

5. The head-worn assembly of claim 4, wherein the frictional clutch is configured to cause translation of the frame with respect to the headband via movement of the kinematic assemblies in the elongated tracks.

6. The head-worn assembly of claim 3, wherein the overhead loop is affixed to the crown loop over the first and second mounting positions.

7. The head-worn assembly of claim 3, wherein the overhead loop is integrally formed with the crown loop.

8. The head-worn assembly of claim 3, wherein an angle between the overhead loop and the crown loop is adjustable.

9. A head-worn assembly, comprising:

a headband configured to encircle a crown of a head of a user, the headband defining elongated tracks oriented along curving sides of the headband, the elongated tracks configured to be positioned on opposite sides of the head of the user;

kinematic assemblies translationally and pivotally mounted to the headband, the kinematic assemblies comprising:

slides mounted within the elongated tracks, the slides engaging a frictional clutch mounted on the headband and configured such that movement of the frictional clutch is configured to cause translation of the kinematic assemblies within the elongated tracks along the curving sides of the headband, and mounting assemblies mounted to the slides;

a frame pivotally affixed to the mounting assemblies and configured to extend around a front of the head of the user;

an optical assembly configured to present an image, the optical assembly mounted on the frame and configured to be positioned in front of the head of the user; and an operational assembly connected to the optical assembly, the operational assembly distributed on the head-worn assembly such that weights of the frame, the optical assembly, and the operational assembly are balanced at a reference axis extending through the mounting assemblies.

10. The head-worn assembly of claim 9, wherein the frictional clutch is mounted on a front portion of the headband and configured to be positioned in front of the head of the user.

11. The head-worn assembly of claim 9, wherein the frame is configured to extend further from the front of the head of the user than the headband.

12. The head-worn assembly of claim 9, wherein the optical assembly is mounted on the frame further from the headband than the frictional clutch such that the frictional clutch is configured to be closer to the front of the head of the user than the optical assembly.

13. The head-worn assembly of claim 9, wherein the mounting assemblies comprise pivot assemblies, and wherein the pivot assemblies are configured to resist pivoting with respect to the slides.

14. The head-worn assembly of claim 13, wherein the pivot assemblies are configured to resist pivoting with respect to the slides for forces below a threshold value.

15. A head-worn assembly, comprising:

a headband configured to encircle a crown of a head of a user, the headband defining elongated tracks oriented along sides of the headband, the elongated tracks configured to be positioned on opposite sides of the head of the user;

kinematic assemblies translationally mounted to the headband, the kinematic assemblies comprising:

slides associated with the elongated tracks, the slides engaging a frictional clutch mounted on the headband, where movement of the frictional clutch is configured to cause translation of the kinematic assemblies in unison in the elongated tracks along the sides of the headband, and mounting assemblies mounted to the slides;

a frame affixed to the mounting assemblies and configured to extend around a front of the head of the user;

an optical assembly configured to present an image, the optical assembly mounted on the frame and configured to be positioned in front of the head of the user; and an operational assembly connected to the optical assembly, the operational assembly distributed on the head-worn assembly such that weights of the frame, the optical assembly, and the operational assembly are balanced at a reference axis extending through the mounting assemblies.

16. The head-worn assembly of claim 15, wherein the operational assembly includes a processing component and a power supply.

17. The head-worn assembly of claim 16, wherein at least one of the processing component and the power supply is distributed at a rear of the head-worn assembly.

18. The head-worn assembly of claim 15, wherein the frictional clutch is configured to cause translation of the frame with respect to the headband via movement of the kinematic assemblies in the elongated tracks.

19. The head-worn assembly of claim 15, wherein the mounting assemblies are configured to pivot with respect to the headband.

20. The head-worn assembly of claim 19, wherein the mounting assemblies are configured to resist pivoting until a pivoting force in excess of a predetermined threshold force is applied.

* * * * *